(12) United States Patent
Chandrashekar

(10) Patent No.: US 12,032,979 B2
(45) Date of Patent: Jul. 9, 2024

(54) AUTOMATED HOST ATTESTATION FOR SECURE RUN-TIME ENVIRONMENTS

(71) Applicant: Amazon Technologies, Inc., Seattle, WA (US)

(72) Inventor: Samartha Chandrashekar, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 441 days.

(21) Appl. No.: 16/676,329

(22) Filed: Nov. 6, 2019

(65) Prior Publication Data

US 2021/0132975 A1 May 6, 2021

(51) Int. Cl.
G06F 9/455 (2018.01)
G06F 9/50 (2006.01)
G06F 21/53 (2013.01)
G06F 21/55 (2013.01)
G06F 21/60 (2013.01)

(52) U.S. Cl.
CPC ........ G06F 9/45558 (2013.01); G06F 9/5077 (2013.01); G06F 21/53 (2013.01); G06F 21/556 (2013.01); G06F 21/602 (2013.01); G06F 2009/45587 (2013.01)

(58) Field of Classification Search
CPC .... G06F 9/45558; G06F 9/5077; G06F 21/53; G06F 21/57; G06F 21/556; G06F 21/602; G06F 2009/45587
See application file for complete search history.

(56) References Cited

U.S. PATENT DOCUMENTS

| 10,298,577 | B1* | 5/2019 | Aithal | G06F 9/45558 |
| 10,459,822 | B1* | 10/2019 | Gondi | G06F 8/75 |
| 2007/0239987 | A1* | 10/2007 | Hoole | G06F 9/45558 713/169 |
| 2013/0054948 | A1 | 2/2013 | Raj et al. | |
| 2014/0089658 | A1* | 3/2014 | Raghuram | G06F 9/45533 380/278 |
| 2015/0007175 | A1* | 1/2015 | Potlapally | G06F 12/145 718/1 |
| 2015/0128240 | A1* | 5/2015 | Richards | H04L 63/0861 726/7 |
| 2016/0134623 | A1* | 5/2016 | Roth | H04L 9/3268 713/156 |

(Continued)

OTHER PUBLICATIONS

AMD, "Secure Encrypted Virtualization API Version 0.16 Technical Preview", Advanced Micro Devices, Publication 55766, Revision 3.06, Feb. 2018. pp. 1-99.

(Continued)

*Primary Examiner* — Lewis A Bullock, Jr.
*Assistant Examiner* — Kevin X Lu
(74) *Attorney, Agent, or Firm* — Alexander A. Knapp; Kowert, Hood, Munyon, Rankin & Goetzel, P.C.

(57) ABSTRACT

A virtualization host is identified for an isolated run-time environment. One or more records generated at a security module of the host, which indicate that a first phase of a multi-phase establishment of an isolated run-time environment has been completed by a virtualization management component of the host, is transmitted to a resource verifier. In response to a host approval indicator from the resource verifier, the multi-phase establishment is completed at the virtualization host.

20 Claims, 13 Drawing Sheets

(56) References Cited

U.S. PATENT DOCUMENTS

| | | | |
|---|---|---|---|
| 2016/0357988 A1* | 12/2016 | Ferguson | H04L 63/0428 |
| 2017/0024570 A1 | 1/2017 | Pappachan et al. | |
| 2017/0185943 A1* | 6/2017 | Wang | G06Q 10/0631 |
| 2017/0279781 A1* | 9/2017 | Lie, Jr. | H04L 63/0853 |
| 2018/0019875 A1* | 1/2018 | Sahita | G06F 12/1491 |
| 2018/0114000 A1 | 4/2018 | Taylor | |
| 2019/0007378 A1* | 1/2019 | Jowett | G06F 9/45558 |
| 2019/0097971 A1* | 3/2019 | Coleman | H04L 63/0281 |

OTHER PUBLICATIONS

Ittai Anati, et al., "Innovative Technology for CPU Based Attestation and Sealing", Retrieved from https://software.intel.com/en-us/articles/innovative-technology-for-cpu-based-attestation-and-sealing on Feb. 9, 2019, pp. 1-19.

Paul Sangster et al., "Virtualized Trusted Platform Architecture Specification", dated Sep. 27, 2011, pp. 1-60.

Fengzhe Zhang, "CloudVisor: Retrofitting Protection of Virtual Machines in Multi-tenant Cloud with Nested Virtualization", dated Oct. 23-26, 2011, pp. 1-14.

Min Zhu et al., "HA-VMSI: A Lightweight Virtual Machine Isolation Approach with Commodity Hardware for ARM", dated Apr. 8-9, 2017, pp. 1-15.

\* cited by examiner

AUTOMATED HOST ATTESTATION FOR SECURE RUN-TIME ENVIRONMENTS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical virtualization host to be shared among multiple users by providing each user with one or more "guest" virtual machines hosted by the single virtualization host. Each such virtual machine may represent a software simulation acting as a distinct logical computing system that provides users with the illusion that they are the sole operators of a given hardware computing resource, while also providing application isolation and security among the various virtual machines. Instantiating several different virtual machines on the same host may also help increase the overall hardware utilization levels at a data center, leading to higher returns on investment.

In many cases, virtualized resources may be used for applications that access or manipulate sensitive information which has to be protected. For example, financial applications, medical applications and the like may all deal with data sets that are intended to be kept confidential. Security-related artifacts such as cryptographic keys, digital certificates and the like may be utilized to ensure confidentiality and privacy of some applications.

Figure 1:
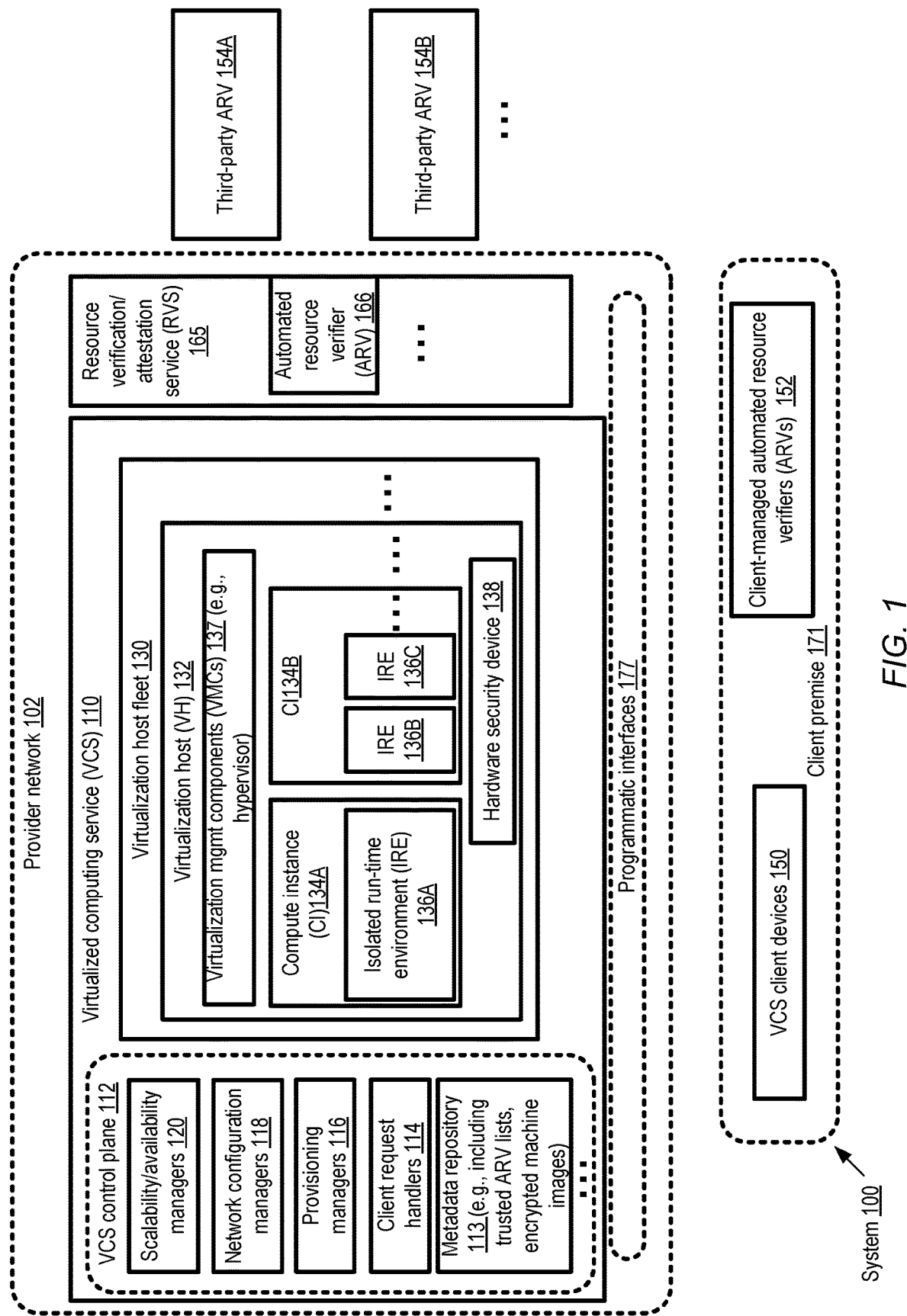
FIG. 1 illustrates an example system environment in which isolated run-time environments may be set up at virtualization hosts of a provider network after the configuration of the virtualization hosts is attested by client-specified automated resource verifiers, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for implementing isolated run-time environments with verifiable configurations for sensitive or enhanced-security computations, run for example within compute instances at automatically-attested hosts of a virtualized computing service at a cloud provider network. Such run-time environments may be set up, for example, on behalf of clients of the virtualized computing service (VCS) to enable computations that use security artifacts (such as cryptographic keys) to be performed at the service using easy-to-use programmatic interfaces, without having to use non-standard programming techniques, while reducing or minimizing the probability of compromise of the security artifacts. The isolated run-time environments may also be referred to as "private software enclaves" or "virtualized enclaves". Several different types of assurances may be provided to a client regarding the security properties of the environment to be used for their computations, including for example (a) an automated real-time attestation, performed by a resource verifier selected in advance by the client, confirming that operations required to instantiate an isolated run-time environment of a requested type have been implemented at the virtualization host and (b) evidence of the contents of the software stack being used for the run-time environment, its parent compute instance, and virtualization management components.

The virtualized computing service used for such isolated run-time environments at attested hosts may be implemented as part of a suite of services of a cloud provider network (sometimes simply called a "cloud"), which refers to a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. The resources of a provider network may in some cases be distributed across multiple data centers, which in turn may be distributed among numerous geographical regions (e.g., with each region corresponding to one or more cities, states or countries). For example, a cloud provider network can be formed as a number of regions, where a region is a geographical area in which the cloud provider clusters data centers. Each region can include two or more availability zones connected to one another via a private high speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet or a cellular communication network).

In at least some embodiments, an automated resource verifier (ARV) selected by the client may comprise programs running at devices outside the provider network (e.g., at a client premise or at a third party premise), over which the operator of the cloud provider network has no control. In some embodiments, the attestation performed by an ARV may be based on evidence (e.g., boot log records formatted according to an industry standard such as a TCG (Trusted Computing Group) specification, or according to other schemas which may in some cases represent extensions/variants of such specifications) generated at a hardware security device incorporated within the virtualization host, with the evidence being transmitted to the ARV from the VCS. After examining the evidence, the ARV may transmit a host approval token to the VCS in at least some embodiments, and such a token may in effect unlock or enable further configuration operations of the isolated run-time environment at the virtualization host, including decryption of one or more machine images, allocation of a client-specified amount of memory and other resources for the isolated run-time environment, etc. If a host approval token is not obtained within a selected timeout interval (e.g., if the ARV is unable to attest to the acceptability of the virtualization host and its virtualization management components in a timely manner), resources that were reserved for the isolated run-time environment and its parent compute instance may be freed, and a message indicating that the isolated run time environment could not be successfully established may be sent to the client in some embodiments. ARVs may also be referred to in some embodiments as automated resource attesters (ARAs).

Clients of the VCS) may already be using compute instances for many types of applications, so extending the compute instances' capabilities to support isolated run-time environments (IREs) may enable the clients to continue to use familiar interfaces while significantly enhancing application security. The probability of compromise or "leakage" of the security artifacts may be reduced in various embodiments with the help of one or more components of virtualization management software (e.g., a security manager and/or a resource segregation manager within a hypervisor) as well as intermediary communication processes (CIPs) set up within the compute instances. In some cases IREs may be used for tasks that do not necessarily require the use of keys or other security artifacts. In some embodiments, a VCS client may simply ensure that the configuration of an IRE has been verified using techniques described herein, and then utilize the IRE to perform the desired tasks—e.g., to run a specific program included in the IRE with a particular input data set and obtain the corresponding result, without using security artifacts such as cryptographic keys.

According to at least some embodiments, a system may comprise one or more computing devices of a virtualized computing service (VCS) of a provider network (e.g., a public cloud computing environment, also referred to as a cloud provider network). The computing devices may include instructions that when executed on or across one or more processors cause the devices to obtain an indication, via one or more programmatic interfaces, of (a) an automated resource verifier (ARV) selected by a VCS client and (b) an encrypted version of a machine image to be used to launch a compute instance containing an isolated run-time environment (IRE). The compute instance may be referred to as a "parent" compute instance in some embodiments, and the IRE may be referred to as a "child" run-time environment of the parent compute instance. The establishment of the isolated run-time environment may comprise a plurality of phases in at least some embodiments, including a preliminary phase (performed for example during initialization or boot operations of a virtualization host and its virtualization management software, prior to the launch of the parent compute instance of the IRE) and one or more additional phases (performed after the initialization or boot operations). A candidate virtualization host for launching the compute instance may be identified (e.g., by control plane components of the VCS) in various embodiments. In at least some embodiments, the VCS may comprise numerous different kinds of virtualization hosts or servers which can be used to set up compute instances of several different supported categories. Based at least in part on the fact that the client wishes to set up a compute instance with an IRE, a particular type of host which comprises a hardware security device configured to generate log records during initialization operations of the host and/or its virtualization management components (VMCs) may be selected as the candidate virtualization host in such embodiments; other virtualization hosts of the VCS may not necessarily comprise such hardware security devices. In other embodiments, all the virtualization hosts of the VCS may comprise such hardware security devices. In some embodiments, the hardware security device of the candidate virtualization host may be similar in features and functionality to trusted platform modules (TPMs) that conform to one or more versions or variants of Trusted Computing Group (TCG) standards/specifications. The log records produced by the hardware security device may be formatted according to a schema which is based at least partly on specifications published by the TCG (or variants thereof), or other similar standards, in at least some embodiments. In some embodiments, schemas that are not based on TCG standards or specifications may be used. In one embodiment, a security device implemented or emulated in software may be used, instead of or in addition to a hardware security device.

One or more log records generated at the security device of the candidate virtualization host (e.g., during a host reboot initiated after the host has been selected as the candidate for the IRE, or during a recent reboot that may have preceded the selection of the host as the candidate) may be transmitted to the ARV in some embodiments. The transmitted log records may include at least one log record which indicates that the preliminary phase of establishing the isolated run-time environment has been completed by a hypervisor of the candidate virtualization host. In at least some embodiments, the ARV may be configured to approve the host if evidence of completion of at least the preliminary phase is provided; in other embodiments, more information such as host capacity information and the like may also be provided to the ARV and used to determine whether the candidate host is acceptable.

The ARV may thus use at least the submitted log records to decide whether the candidate virtualization host is acceptable for the client's IRE or not in some embodiments. If the ARV deems the host acceptable (e.g., if the contents of the received log records match, or are compatible with, example acceptable log records that were provided earlier to the ARV), a host approval message including a security key or token may be provided to the VCS in various embodiments. The encrypted version of the machine image may be decrypted using the key or token in some embodiments. A virtualization management component (VMC) (e.g., a hypervisor) of the candidate virtualization host may launch the parent compute instance, allocating a set of resources (including a portion of memory of the candidate virtualization host) to the parent compute instance. In addition, the VMC may perform any additional phases of the process for establishing the IRE, including the final phase of establishment of the IRE. A subset of the portion of memory that was set aside for the parent VMC may be allocated for exclusive use by the IRE in such additional phases. This subset of memory may be configured such that it is inaccessible from programs running outside the IRE; as such, any security artifacts retained within the subset may not be read from outside the IRE. In at least some embodiments, to further enhance the security of the IRE, network communications with endpoints outside the candidate virtualization host may be prohibited from the IRE, and/or writes to persistent storage devices may be prohibited from the IRE. After the IRE has been established, any desired computations may be performed using the IRE, and the results of such computations may be transmitted via secure communication pathways (e.g., using a communication intermediary process set up at the parent compute instance).

As one skilled in the art will appreciate in light of this disclosure, certain embodiments may be capable of achieving various advantages, including some or all of the following: (a) providing easy-to-attest standards-based evidence regarding the secure configuration of isolated run-time environments to independent entities (such as client-selected resource verifiers) which are not controlled by an operator of a provider network at which the isolated run-time environments are established, (b) substantially enhancing the security of applications that deal with sensitive or confidential data and are run at virtualized computing services, (c) reducing the amount of processing and/or networking resource usage associated with recovery operations (such as revocations of digital certificates, re-generation and re-distribution of encryption keys etc.) resulting from potential or actual compromises of security artifacts, and (d) improving the user experience of clients of virtualized computing services, as well as administrators of applications that are run at such services, by providing clearer insights into the resources used specifically for sensitive data computations.

According to at least some embodiments, an automated resource verifier may comprise one or more programs running at resources outside the VCS, e.g., at a server located in a data center or premise of the client, and the client may submit a network address of the ARV to the VCS in advance of a request to establish the IRE. The log records generated at the virtualization host may be transmitted to such a client-provided network address. In one embodiment, the ARV may be implemented and/or run by a third party entity approved/selected by the client—e.g., an entity other than the client and the provider network operator. According to at least one embodiment, to enable VCS clients and/or third parties to set up attestation managers and/or other types of resource verification managers, the VCS may provide example source code (e.g., in the form of a reference implementation of an ARV) via its programmatic interfaces. In one embodiment, the provider network at which the VCS is implemented may implement a resource verification service which can be used to approve host configurations for IREs if a client does not wish to use a third-party or client-managed ARV.

According to at least one embodiment, a client may provide an indication of multiple alternate ARVs. In one such scenario, for example, a client may specify a primary, secondary, and tertiary automated resource verifier, and a sequence in which the alternate ARVs are to be contacted from the VCS to obtain approval for a candidate virtualization host. In one example, if the primary ARV does not respond to the provided log records of a candidate virtualization host within T1 milliseconds, the log records may be provided to the secondary ARV, and if the secondary does not respond within T2 milliseconds, the log records may be sent to the tertiary ARV. If the tertiary ARV does not respond within T3 milliseconds, the attempt to configure the IRE at the candidate virtualization host may be abandoned, and a message indicating the failure may be sent to the client in at least one embodiment. Parameters such as the timeouts T1, T2, and T3 may be indicated programmatically by the client in at least some embodiments to the VCS.

In some embodiments, as part of a set of preliminary operations performed on behalf of the client prior to identifying candidate virtualization hosts for the client's IREs, examples of acceptable log records may be generated at the VCS and transmitted to a set of one or more ARVs, e.g., as part of a handshake protocol between the VCS and the individual ARV(s) selected by the client. Based on successful completion of such a preliminary handshake protocol, the VCS may register the set of ARVs, e.g., by including a respective record identifying the ARVs as trusted intermediaries for host verification in a metadata repository maintained at the VCS.

In some embodiments, host attestation via client-selected ARVs may be performed at several points during the lifetime of an IRE and/or its parent compute instance, and not just the first time that the IRE is instantiated. For example, a similar log-records-based attestation procedure may be implemented in one embodiment if/when an IRE or its parent compute instance is migrated to another virtualization host, if and/when the virtualization host being used for the IRE is rebooted or restarted, and so on. In some embodiments, a client may programmatically indicate or approve the kinds of lifecycle operations for which the host attestation procedure is to be implemented on the client's behalf.

In addition to verifying or attesting the configuration of the virtualization host, in some embodiments additional security-related information pertaining to the IRE, its parent compute instance and/or the virtualization management components (such as hypervisors) used for the IRE may be provided to clients if desired. Any of several types or categories of compute instances may be set up in different embodiments for an IRE, including for example guest virtual machines, bare metal instances which directly access some of the host's hardware, and so on. In some embodiments, some virtualization management tasks may be off-loaded from the primary processors or CPUs of the host; for example, one or more virtualization management offload cards linked to the CPUs via a peripheral interconnect may be used to implement some types of virtualization management tasks (including, in some cases, allocation of memory for compute instances, networking-related tasks, storage-related tasks and the like).

As mentioned earlier, a subset of resources that were allocated for the parent compute instance may be segregated or set aside for exclusive use by an IRE established within, and tightly coupled with, the compute instance in some embodiments. For example, if K gigabytes of memory were designated for the compute instance, a section of memory comprising L gigabytes, where L<K, may be carved out (e.g., by a virtualization management component of the host) for the isolated run-time environment, such that the compute instance can only access the remaining (K−L) gigabytes during the lifetime of the isolated run-time environment. In such an embodiment, the contents of the memory segregated for the IRE may not be visible from any programs or processes that are outside (i.e., not part of) the IRE itself. Other types of resources, such as virtualized processors, may also be set aside for the IRE in some embodiments, reducing the amount of usable resources of that type that remain available for the compute instance. In various embodiments, a number of constraints regarding interactions with other entities may be enforced on an IRE—e.g., network communications with endpoints outside the virtualization host may be prohibited, processes running within the IRE may not be granted access to persistent storage devices or file systems, and so on.

In at least some embodiments, a communication intermediary process (CIP) (or an intermediary agent comprising one or more processes) may be established within the parent compute instance for interactions with the IRE. In some implementations a section of shared memory which is mapped within respective address spaces of the IRE and the compute instance may be used as a local communication channel between the CIP and the IRE. In at least some embodiments, a bi-directional notification based mechanism may be used for communications between the CIP and the IRE. In contrast to techniques which involve polling, an interrupt-driven approach may be used for communications between the CIP and the IRE in such embodiments. In other embodiments, a polling technique may be employed.

The virtualization host used for an IRE may comprise a security manager, e.g., comprising one or more processes running within the hypervisor in some embodiments. The security manager may measure, analyze or verify the software configuration of the IRE, e.g., in response to a request from a client of the VCS, and provide a result of its measurements, analysis or verification to the client. This information may be in addition to the information provided to the ARV prior to the completion of the establishment of the IRE. In some embodiments, such a query for additional verification information may be sent to the parent compute instance by the client (or by some other entity selected/authorized by the client), and the CIP may transmit an internal version of the query to one or more processes within the IRE; the IRE may then interact with the security manager to enable measurements or analysis of the IRE software stack to be performed. Any appropriate software verification or attestation tests/techniques may be employed in different embodiments, including for example generating a hash value representing the installed software of the IRE which can be compared with a set of hash values representing respective acceptable software configurations. In at least some embodiments, the response provided by the security manager may include evidence of the identity of the security manager (e.g., a digital certificate rooted via a certificate chain to an authority trusted by the client), evidence of the identity of the IRE, and/or other elements such a random number or nonce that was included in the query sent by the client.

If the VCS client is satisfied that the result of the verification/attestation is being provided by a trusted party (the security manager), and the result of the verification analysis or attestation of the IRE is acceptable to the VCS client, in various embodiments a secure communication channel (similar in concept to a TLS (Transport Layer Security) session) may be established between the client and the IRE. Such a channel or session may utilize the CIP as an intermediary, in that encrypted messages prepared at the IRE or the client may be passed on to the client or the IRE by the CIP. Using such a channel, an encrypted application security artifact, such as a cryptographic key to be used to later perform computations on behalf of the client at the IRE, may be obtained at the IRE. The security artifact may be decrypted at the IRE in various embodiments. Note that although the CIP may assist in the transmission of messages between the client and the IRE via the secure channel, the security artifact may be encrypted using a shared secret inaccessible to the CIP in such embodiments; as such, the decrypted version of the security artifact may not be available at the CIP or any other process or program running outside the IRE at the virtualization host. After the security artifact is obtained, the IRE may perform computations using the security artifact at the client's request, and results of the computations may be provided from the IRE (via the CIP) to any desired destination in various embodiments.

As a result of the various constraints placed on IRE communications, and the techniques used to verify the trustworthiness of the IRE and the underlying hardware/software stack, the probability that the security artifacts are misused or compromised may be substantially reduced in various embodiments; for example, even a user that has root or administrator privileges with respect to the parent compute instance of the IRE may not be able to access or obtain the un-encrypted security artifact in at least some embodiments. As a result, various types of applications accessing sensitive data may be run safely using IREs in such embodiments, including so-called "blinded execution" applications in which algorithms are executed using sensitive data at IREs such that programs or processes of the parent compute instance only have access to inputs and outputs of the algorithms, and do not have access to the sensitive data itself. In some scenarios, while a VCS client may verify the trustworthiness of an IRE with the help of a security manager as discussed above, the transmission of a security artifact via a secure communication channel may not be required for the applications to be run at the IRE. Instead, after the configuration of the IRE has been checked and found satisfactory, in some embodiments a client may simply utilize the IRE to run a desired application which does not require a security artifact or a secure communication channel of the kind described above.

The virtualized computing service may implement a set of programmatic interfaces that can be used by clients to submit requests associated with IREs in various embodiments. Such interfaces may include, for example, one or more web-based consoles, application programming interfaces (APIs), command-line tools, graphical user interfaces and the like. Using such interfaces, in one embodiment a VCS client may submit a request to launch a compute instance that comprises an IRE at an attested host—that is, a request to launch a compute instance may also include parameters that indicate that an IRE should be set up, and that the virtualization host used for the IRE should be verified by an entity selected by the client. In other embodiments, a compute instance may be set up in response to a first programmatic request, and then an IRE may be instantiated later within the compute instance in response to a second programmatic request. In some embodiments, programmatic interfaces of the VCS may be used to specify various details of an IRE—e.g., a virtual machine image to be used for an IRE (distinct from the machine image used for the parent compute instance) may be indicated programmatically, a software container to be used for an IRE may be specified programmatically, programs to be run within the IRE, and so on. A variety of programmatic models may be supported for IREs in some embodiments, including a model in which a library operating system is combined with a unikernel, a model in which industry standard software containers may be used at or for IREs, and so on.

In at least some embodiments, one or more parameters specified by a VCS client or chosen at the VCS control plane (the administrative components of the VCS) may limit the lifetime of an IRE—e.g., an IRE may be terminated or shut down T minutes after it is instantiated. Such constraints imposed on IRE lifetimes may further reduce the likelihood that security artifacts made available to the IRE are compromised or acquired by entities other than the intended recipients or users of the security program. In at least some embodiments, several different IREs may be set up using the resources of a given compute instance, e.g., with differing amounts of memory and/or other resources allocated for exclusive use by individual ones of the IREs. Individual ones of the IREs in such embodiments may be used for respective distinct applications dealing with sensitive data, for example.

Example System Environment

FIG. 1 illustrates an example system environment in which isolated run-time environments may be set up at virtualization hosts of a provider network after the configuration of the virtualization hosts is attested by client-specified automated resource verifiers, according to at least some embodiments. As shown, system 100 includes various resources of a virtualized computing service (VCS) 110 of a provider network 102, including a virtualization host fleet 130 and a set of administrative components collectively referred to as the VCS control plane in the depicted embodiment. Provider network 102 may also be referred to as a "public cloud" environment, a "cloud provider network", or simply as a "cloud" in some embodiments as mentioned earlier, and the resources of provider network 102 may be distributed among multiple data centers.

The VCS 110 may implement one or more programmatic interfaces 177, including for example one or more web-based consoles, a collection of application programming interfaces (APIs), command line tools, graphical user interfaces and the like. Such interfaces may be utilized from VCS client devices 150 to request various types of configuration operations, receive corresponding responses and the like. For example, programmatic requests to register automated resource verifiers (ARVs) to be used for a client's compute instances, to launch or instantiate compute instances (CIs) 134, such as CIs 134A or 134B, and/or to set up isolated run-time environments (IREs) 136 (e.g., IRE 136A, 136B, or 136C) may be submitted using interfaces 177. Individual compute instances 134 may comprise respective virtual machines and/or other types of program execution platforms (such as bare-metal instances with direct control granted to more hardware devices than is granted to guest virtual machines) in various embodiments.

In order to be enable IREs 136 to be set up at automatically-attested virtualization hosts for a client of the VCS 110, in at least some embodiments a few preliminary operations may be performed in advance. For example, a client may programmatically provide indications (e.g., including network addresses) of one or more automated resource verifiers (ARVs) to be used to confirm, prior to establishing a compute instance 134 with an IRE 136 at a given virtualization host, the configuration or status of the virtualization host. Any combination of a variety of ARVs may be indicated programmatically by a client, e.g., including client-managed ARVs 152 (running at client premises such as premise 171), third-party ARVs such as 154A or 154B running at other resources outside the provider network, and/or ARVs 166 established within a resource verification/attestation service 165 within the provider network itself. In some embodiments, a client may indicate a chain of multiple ARVs, with an associated sequence and timeouts associated with the elements of the chain, so that if one or more of the ARVs of the chain fail to respond in a timely manner to a host verification request, other ARVs of the chain may be consulted. In response to the information about the client-selected ARV(s), in at least one embodiment the VCS may initiate a handshake procedure with the ARVs (e.g., using credentials also supplied programmatically by the client for communications with the selected ARVs) and register the ARVs within a trusted ARV list in a metadata repository 113. In one embodiment, during the handshake procedure, the VCS may provide examples of the kinds of log records or other evidence that will be supplied to the ARV regarding candidate virtualization hosts, and the ARVs may provide examples of the kinds of approval tokens that the ARV may provide in response to such evidence. In some embodiments, the preliminary or prerequisite operations needed to enable automated attestation based establishment of IREs may also include the client supplying, to the VCS 110, an encrypted machine image to be used to launch a compute instance within which an IRE can later be set up; such machine images may also be stored in VCS metadata repositories.

In some embodiments, at least some types of programmatic configuration requests may be directed to the VCS control plane 112, responsible for administrative operations with regard to VCS resources. The control plane 112 may comprise a number of subcomponents, including one or more client request handlers 114, provisioning managers 116, network configuration managers 118, scalability/availability managers 120, metadata repositories 113 and the like, which may respectively be implemented using some combination of hardware and software at one or more computing devices in the depicted embodiment. After the preliminary operations mentioned above have been completed, a client may submit a request to set up one or more IREs at one or more attested virtualization hosts 132. Such a request may initially be processed at a request handler 114.

The request handler 114 may perform some initial checking (e.g., to verify that the client has permissions for the kinds of operations being requested), and then pass on internal versions of the request to one or more other components of the control plane for implementation. The provisioning managers 116 may, for example, be responsible for identifying a specific virtualization host (VH) 132 at which one or more compute instances are to be launched in the depicted embodiment for the IREs; for example, only hosts which comprise security devices 138 may be selected for such compute instances. Network configuration managers 118 may be responsible for setting up connectivity between the compute instances 134 and other entities inside and outside the provider network 102 in various embodiments, including for example connectivity with storage services and/or other services (not shown in FIG. 1) of the provider network. Scalability and availability managers 120 may be responsible for automatically modifying the configurations of compute instances and other resources, e.g., based on load balancing considerations, increases or decreases in workloads, and so on. In some embodiments, the control plane 112 may also include migration managers that transfer compute instances (along with their isolated run-time environments) between virtualization hosts, e.g., based on analysis of collected metrics and/or based on requests from VCS clients.

Virtualization hosts such as VH 132 of the VCS 130 may each comprise one or more virtualization management components (VMCs) 137 that act as intermediaries between the compute instances 134 launched at the VHs and at least some of the hardware elements of the VHs, including for example physical processors (e.g., central processing units (CPUs), graphical processing units (GPUs), etc.), memory, persistent storage devices, networking cards, peripheral devices and the like. In some embodiments, at least a portion of virtualization management responsibilities may be off-loaded from the hypervisor to a hardware card (e.g., a card linked to the CPUs of the host via a Peripheral Connect Interface or PCI-Express interconnect) in order to free up more of the computing capacity of the primary processors of the host for compute instances.

In some embodiments, the kinds of operations performed at the VCS at run-time in response to a request for an IRE at an automatically attested virtualization host may differ from operations performed for instantiating other types of run-time environments or compute instances which do not require host attestation. For example, for an IRE to be set up at a pre-attested virtualization host, a provisioning manager 116 may identify a candidate virtualization host 132 which comprises a hardware security device 138 configured to generate a plurality of log records during one or more initialization operations (e.g., a reboot of the candidate virtualization host, or a reboot/restart of its virtualization management components 137 such as a hypervisor). Further, the VCS control plane may cause at least some log records of the plurality of log records generated by such a hardware security device of the candidate virtualization host to be transmitted to a registered ARV pre-selected by the client in at least some embodiments. The information transmitted to the ARV may for example indicate that the preliminary phase of establishing an IRE has been completed by a hypervisor and/or by some other component of the candidate virtualization host during the initialization operations.

After the client-selected ARV (e.g., an ARV 152, 154 or 166) analyzes and reviews the evidence provided, it may send a host approval token or key to the VCS (e.g., to a virtualization management component (VMC) 137 such as the hypervisor of the candidate virtualization host, and/or to a control plane component of the VCS) in some embodiments, and such an approval indication may then lead to the completion of other phases of the IRE establishment. In some embodiments before initiating such additional phases, the VCS may verify that the approval indication was received from a trusted ARV which has been pre-registered. In one embodiment, the approval token may comprise a cryptographic key which can be used to decrypt the encrypted machine image to be used to launch the parent compute instance 134 of the IRE 136. In some embodiments, several different machine images may be decrypted using such approval token(s), including one for the parent compute instance, one for the IRE itself, one for a software container to be launched within the IRE, and so on. A VMC 137 (e.g., a hypervisor) at the candidate virtualization host may launch the parent CI 134 using the decrypted version of the machine image of the parent CI and a set of resources of the candidate virtualization host in various embodiments. The set of resources may include a first portion of a memory of the candidate virtualization host, for example. Additional phases of establishment of the IRE may also be performed by the VMC 137 in some embodiments. In such phases, a subset of the first portion of memory may be allocated for exclusive use by the IRE in the additional phase; that is, the subset may be kept inaccessible from programs running outside IRE. In some embodiments, network communications with endpoints outside the candidate virtualization host may be prohibited from the isolated run-time environment to further enhance the security level of operations performed within the IRE 136.

The compute instance 134 whose resources are used for the IRE 136 may be referred to as the "parent" compute instance of the IRE, and the IRE may be referred to as a child or dependent run-time environment, logically tightly linked to the parent compute instance. Thus, for example, IRE 136A may be set up with CI 134A as its parent, while CI 134B may be configured as the parent compute instance of IREs 136B and 136C. Note that not all compute instances at the VHs 132 of the VCS 110 may necessarily have child IREs in the depicted embodiment. In at least some embodiments, a variety of compute instance types or categories may be supported at the VCS 110, with some categories enabling IREs to be established if desired at compute instances at pre-attested hosts, others that enable IREs to be established without VH pre-attestation, and yet other categories that do not support IRE instantiation. As indicated in FIG. 1, resources of a given virtualization host 132 may be used for multiple compute instances in at least some embodiments, some of which may be set on behalf of different VCS clients. For example, the two compute instances (134A and 134B) set up at VH 132 may have been established for different VCS clients. Furthermore, respective subsets of resources allocated to a given compute instance may be segregated or carved out for multiple IREs 136 in some scenarios (as in the case of CI 134B, which is the parent of both IRE 136B and IRE 136C). In at least some embodiments, the lifetimes of individual IREs 136 and their parent compute instances (or their peer IREs at the same compute instance) may differ— e.g., it may be the case that IRE 136A is terminated before CI 134A, or that IRE 136B is terminated before IRE 136C in the example scenario shown in FIG. 1. The resources of the parent compute instance that are segregated or set aside for an IRE may not be accessible to programs or processes running at the parent compute instance in at least some embodiments—for example, if 4 gigabytes of a total of 32 gigabytes of memory that was originally allocated to CI 134A is set aside for IRE 136A, programs/processes within CI 134A may only be able to access and use the remaining 28 gigabytes while IRE 136A remains in existence.

When configuring or instantiating an IRE 136, in various embodiments a number of constraints may be enforced to limit the manner in which programs or processes within the IRE can communicate or interact with other entities (e.g., processes/programs running in the parent compute instance, or outside the parent compute instance). In at least one embodiment, for example, an IRE process/program may be prohibited from over-the-wire networking communications with any entities outside the IRE (e.g., by not configuring virtual or physical network interfaces accessible the IRE). Similarly, in various embodiments, IREs 136 may be configured such that access to persistent storage devices and/or file systems is prohibited—that is, processes/programs within an IRE 136 may not be able to perform reads or writes to persistent storage. In some embodiments, one or more communication intermediary processes (CIPs) or daemons may be instantiated in the parent compute instance of an IRE, which are permitted to use a local communication channel to communicate with the IRE on behalf of other processes/programs inside or outside the parent compute instance. For example, in some embodiments one or more buffers of shared memory, mapped to both a CIP and an IRE, may be used for such communications. In at least some such embodiments, an interrupt-based or notification-based communication technique may be used for bidirectional communications between a CIP and an IRE—e.g., a notification may be generated by the CIP when a message is ready for the IRE, and similar notifications may be used to indicate when the IRE has finished reading the buffers, when the IRE has an outbound message ready in a buffer, when the CIP has finished transmitting that outbound message, and so on. In some embodiments, such a communication mechanism may be referred to as a "doorbell" mechanism.

In at least some embodiments, a virtualization management component of a VH 132, such as a hypervisor, may comprise a security manager responsible for verifying or measuring the software configuration of an IRE 136. Note that this verification is in addition to the attestation of the virtualization host itself, which may be done with the help of the ARVs as discussed earlier. For example, a client may submit a verification query directed to an IRE 136, which may eventually be obtained at the security manager. In one example pathway for such a request, the verification request may be obtained at the communication intermediary process (CIP), which may pass it on to the IRE via a local communication channel, and the IRE may in turn notify the security manager regarding the query. The security manager may itself perform measurements and/or an attestation of the software stack of the IRE, and the results of such configuration verification or analysis operations may be provided to the query submitter in various embodiments. In at least one embodiment, one or more hash functions may be applied to the installed software of the IRE by the security manager, and a result of the hash functions may be compared with hash results of acceptable configurations by the client. Evidence that the security manager itself can be trusted (such as a digital certificate identifying the security manager), as well as a unique identifier of the IRE 136 and/or its parent compute instance may also be provided in response to a configuration verification query in at least some embodiments. In at least one embodiment a client may submit queries for analyzing the configuration of a given IRE several different times during the lifetime of the IRE, as desired, and receive respective results of the analysis performed in response to each query by the security manager.

After the client on whose behalf the IRE is established is satisfied regarding the trustworthiness of the IRE, one or more security artifacts (e.g., cryptographic keys that are to be used for computations of one or more applications on behalf of the client at the IRE) may be securely transmitted if needed to the IRE in various embodiments. A mechanism that does not allow unencrypted versions of the security artifacts to be intercepted or accessed by any parties other than the client supplying the artifact and the IRE itself may be employed in such embodiments. In some embodiments, for example, the logical equivalent of a TLS (Transport Layer Security) session may be set up between a client and the IRE, and the security artifacts may be encrypted using a shared secret key determined/generated by both the IRE and the client during the session. Note that even though the encrypted version of an artifact may pass through the communication intermediary process (CIP) on its way to the IRE from the client, the CIP may not have the shared secret key needed to decrypt the artifact in various embodiments. The decrypted version of the artifact may be generated within the IRE using the shared secret key in at least some embodiments.

After the security artifact(s) have been obtained within the IRE, requests to perform computations on behalf of the client using the artifact(s) may be conveyed to the IRE by the CIP, e.g., from other processes/programs within the parent compute instance in various embodiments. Consider an example scenario in which portions or all of a digital media object (such as a video or an audio recording) are to be transformed or processed using a security artifact on behalf of a media distribution application. A request to perform the transformations may be passed to the IRE from an application process running in the parent compute instance, along with the digital media object itself, via the CIP in this example scenario. The transformations may be implemented at the IRE using the security artifact, and the results may be provided to the application process via the CIP. In this example scenario, the security artifact may be used within the IRE to achieve the computation objectives of the application, without ever being exposed to any other processes or programs outside the IRE at the virtualization host. In at least some embodiments, after the secure computations needed from an IRE are completed, the IRE may be terminated, and the resources that were earlier segregated away from the parent compute instance may be returned to the parent compute instance.

In some embodiments, the VCS 110 may provide, e.g., via programmatic interfaces 177, source code and/or other artifacts that can be used by a VCS client (or third parties) to implement an ARV. For example, a representation of a reference implementation of an ARV may be provided to clients and other interested parties, such that ARVs which comply with a set of expected application programming interfaces of the VCS can be established at various resources outside the provider network, and customized to meet client's particular host attestation requirements as needed.

In at least one embodiment, host attestation using client-selected ARVs may be performed at several points during the lifetime of a virtualization host, an IRE and/or its parent compute instance. For example, such attestation may be performed if/when a parent compute instance is stopped/terminated/restarted/migrated, and/or if/when the virtualization host itself is restarted or rebooted. In at least one embodiment, a client may specify the set of operation types for which host attestation is required—e.g., whether attestation is only required for initial launch of an IRE and migrations of the IRE, or whether attestation is required any time the host reboots, etc. In some embodiments, the VCS may support a programmatic interface that can be used for on-demand host attestation—e.g., a client may request that the configuration of a virtualization host being used for the client be attested by an SRV at any desired point in time.

Example Virtualization Host Timeline

Figure 2:
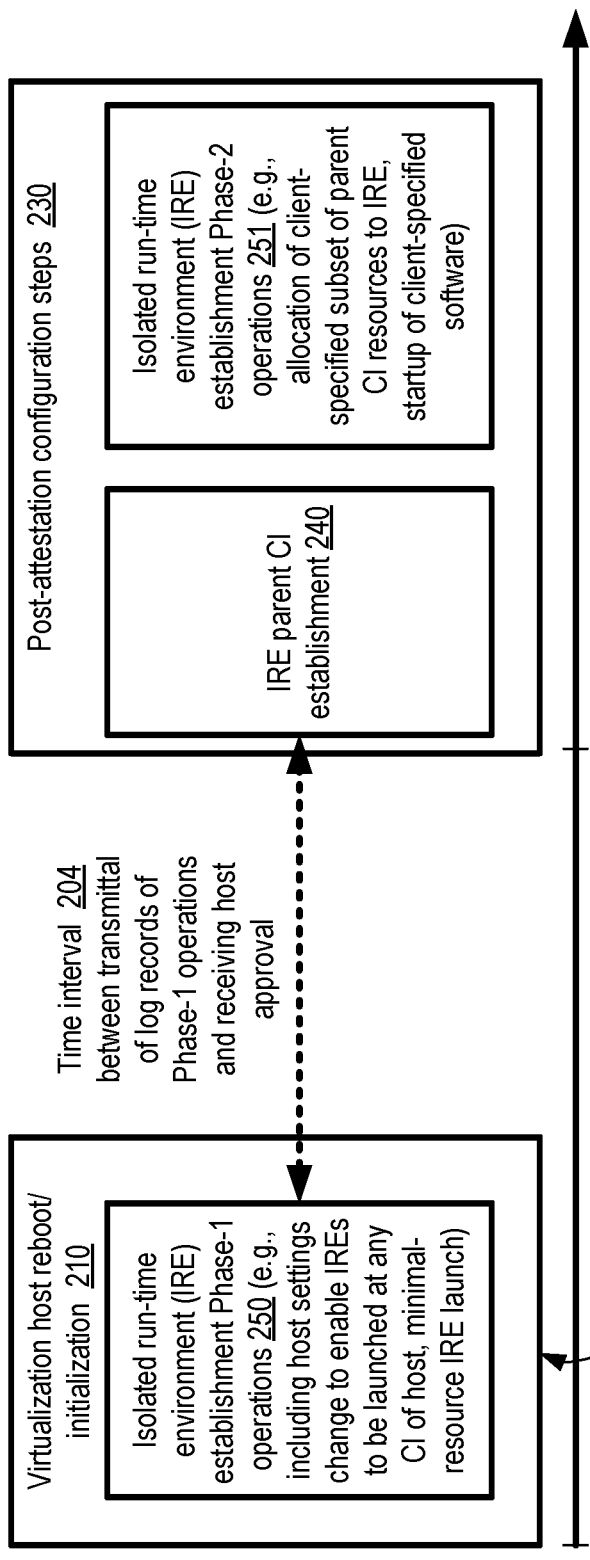
FIG. 2 illustrates an example timeline of operations that may be performed at a virtualization host to configure isolated run-time environments, according to at least some embodiments.

FIG. 2 illustrates an example timeline of operations that may be performed at a virtualization host to configure isolated run-time environments, according to at least some embodiments. At approximately time T1 along timeline 204 of the lifecycle of a virtualization host, a reboot/initialization 210 of the virtualization host may be initiated. During this initialization, at least some virtualization management components (e.g., including a hypervisor) of the host may be started up, and a first phase (Phase-1) 250 of a multi-phase establishment procedure of an isolated run-time environment (IREs) may be performed in the depicted embodiment. In some embodiments, for example, a hypervisor may change one or more configuration settings of the virtualization host to enable IREs to be established by default within any compute instances that are subsequently launched at the host. In at least one embodiment, a preliminary or nascent version of an IRE to which a minimal set of resources (e.g., a very small amount of memory, or zero memory) is allocated may be launched during the initialization phase operations 210 by a virtualization management component of the host. Some resources may be temporarily reserved or set aside for future use by the IRE during Phase-1 in some embodiments.

In various embodiments, the operations performed during the initialization or reboot of the virtualization host and/or the initialization of the virtualization management components may be logged by a hardware security device 222. Such log messages, which indicate that the Phase-1 IRE establishment operations have been completed, may be transmitted to one or more automated resource verifiers (ARVs) in the depicted embodiment. In some embodiments, additional information pertaining to the virtualization host (e.g., information about the type of processors of the host, a unique identifier of the host, a unique identifier of the hardware security device, the version of the hypervisor software, etc.) may also be sent to the ARVs. In one implementation, the information may be transmitted directly from the virtualization host to the ARVs, while in other implementations, the information may be transmitted via one or more intermediaries such as VCS control plane components. In some embodiments, the information may be encrypted using a key provided by the client on whose behalf the IRE is to be set up at the virtualization host. In at least one embodiment, the log message contents may be formatted according to an industry standard, such as a TCG (Trusted Computing Group) specification.

After the evidence regarding the completion of Phase-1 of IRE establishment is transmitted, further operations to configure the parent compute instance and to complete the establishment of the IRE may be deferred in the depicted embodiment until an indication of approval of the virtualization host is received. In the example scenario shown in FIG. 2, time interval 204 may elapse before a response from at least one of the ARVs is received, comprising one or more tokens or artifacts indicating approval (or, in some cases, rejection) of the host by the ARV(s). The length of time interval 204 may vary based on any of several factors in different embodiments—e.g., the latency of message transfers to/from the ARVs, the congestion level on the pathways to/from the ARVs, the workload levels of the ARVs, and so on. In some implementations time interval 204 may, for example, comprise only a few milliseconds. In other implementations, time interval 204 may comprise a few seconds or minutes. In at least some embodiments, a client (or the VCS) may set a time limit for responses from ARVs, such that the absence of a response from an ARV to the evidence regarding Phase-1 operations provided from the virtualization host for longer than the set time limit may be interpreted as a rejection of the virtualization host.

If an ARV rejects the virtualization host (either explicitly, or due to a lack of a timely response), the establishment of the parent compute instance of the IRE, as well as any further IRE configuration operations, may be abandoned in various embodiments. A message indicating a failure to launch the IRE may be provided to the client in some embodiments, and if desired, the client may submit another request to launch the IRE. Resources that were set aside for the IRE during Phase-1, if any, may be freed if the ARV rejects the host in some embodiments.

In contrast, if the host is accepted by the ARV(s), indicating a successful attestation or verification of the host, post-attestation configuration steps 230 may be initiated at approximately time T2 along timeline 204 in the depicted embodiment. During such post-attestation steps, the parent compute instance of the IRE may be established (as indicated in element 240), and the remaining phases of establishing the IRE (e.g., Phase-2 operations 251) may be completed. For example, from among the resources (including a section of memory of the virtualization host) allocated to the parent compute instance, a subset may be segregated or set aside for exclusive use by the IRE in the depicted embodiment. The amount of memory to be set aside for the IRE may have been specified by the client in some embodiments. A client-specified software stack may also be initialized or set up during Phase-2 operations in some embodiments.

Example Preparatory Operations for Isolated Run-Time Environment Setup

Figure 3:
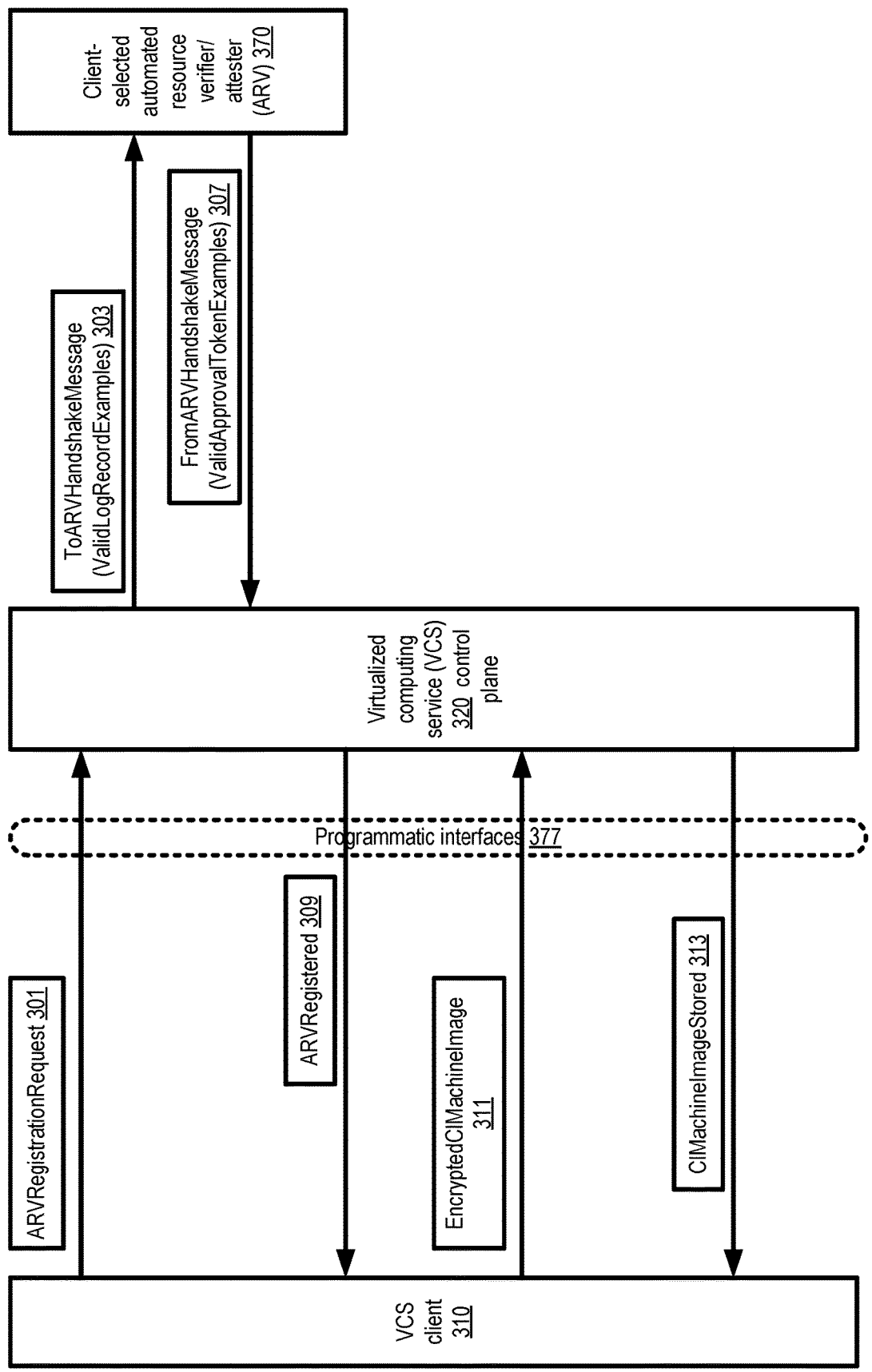
FIG. 3 illustrates an overview of prerequisite operations that may be performed at a virtualized computing service prior to instantiating isolated run-time environments within compute instances at attested virtualization hosts, according to at least some embodiments.

As mentioned earlier, in order to support the capability of establishment of IREs at automatically-attested virtualization hosts for a client of a VCS, a set of preparatory operations may be performed before such IREs can actually be configured in response to respective client requests. FIG. 3 illustrates an overview of prerequisite operations that may be performed at a virtualized computing service prior to instantiating isolated run-time environments within compute instances at attested virtualization hosts, according to at least some embodiments. Using programmatic interfaces 377 of VCS 320 (such as APIs, command-line tools, graphical user interfaces or a web-based console), a client 310 may submit an ARV registration request 301 in the depicted embodiment, e.g., indicating a network address of an automated resource verifier (ARV) 370 selected by the client. Additional information required to secure communications with the ARV, such as a security key or credential, may also be provided in the registration request 301 in some embodiments.

Using the information provided by the client, the VCS 320 (similar in features and functionality to VCS 110 of FIG. 1) may initiate a handshake procedure with the client-selected ARV in the depicted embodiment. The number of handshake messages exchanged between the VCS 320 and the ARV 370 may vary in different embodiments. In an example ToARVHandshakeMessage 303, the VCS (e.g., a control plane component of the VCS) may provide examples of valid log messages generated by hardware security devices at candidate virtualization hosts as evidence of the completion of a phase of IRE initialization. Such valid log messages may, for example, be stored in a database of acceptable log messages at the ARV.

Similarly, in at least some implementations, the ARV 370 may send a FromARVHandshakeMessage 307 during the handshake procedure to the VCS 320, indicating valid examples of host approval tokens and confirming that the earlier handshake message 303 has been received and validated at the ARV. In response to the successful completion of the handshake procedure, ARV 370 may be added to a registry of trusted ARVs within a metadata repository of the VCS in some embodiments. In the embodiment depicted in FIG. 3, an ARVRegistered message 309 may be sent from the VCS to the client 310, indicating that the specified ARV has been included in the VCS metadata.

According to at least some embodiments, a client 310 may submit an encrypted compute instance machine image to be used for the parent compute instances and the IREs to be set up on attested hosts for the client by the VCS, as indicated in message 311. In at least one embodiment, as mentioned earlier, the decryption of the machine image may require a host approval token from the ARV; as such, the machine image indicated via message 311 may not be used at the VCS until the host at which it is to be used is approved by the ARV. The machine image may be stored at a VCS repository, and a CIMachineImageStored message 313 may be sent to the client from the VCS in some embodiments. Note that in some embodiments, the machine image may be provided to the VCS before an ARV is registered. In at least one embodiment, the machine image to be used to set up the parent compute instance and the IRE may not necessarily be encrypted.

Example Isolated Run-Time Environment Instantiation Workflow

Figure 4:
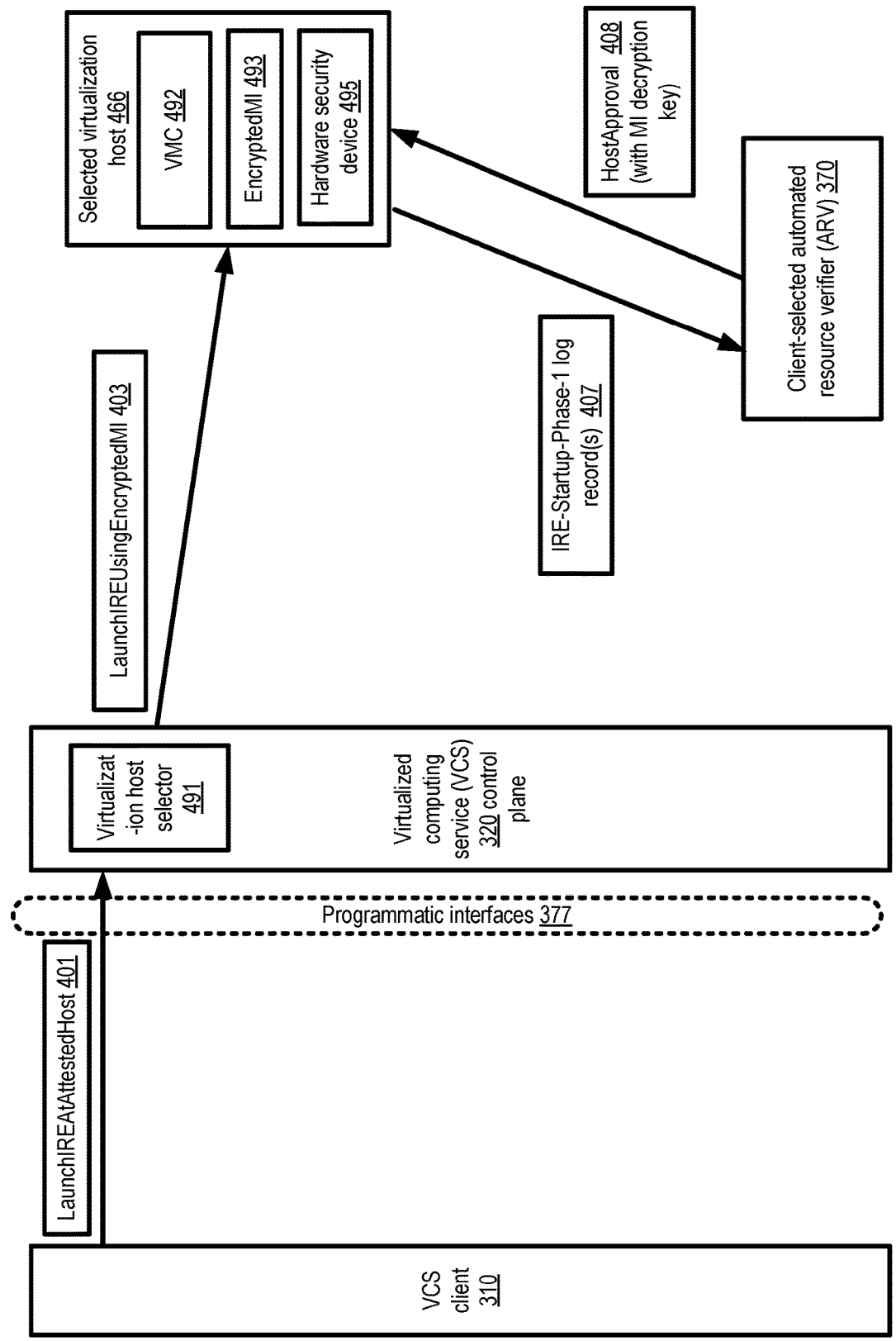
FIG. 4 and FIG. 5 collectively illustrate an overview of a workflow for the instantiation of isolated run-time environments within compute instances at attested virtualization hosts, according to at least some embodiments.
Figure 5:
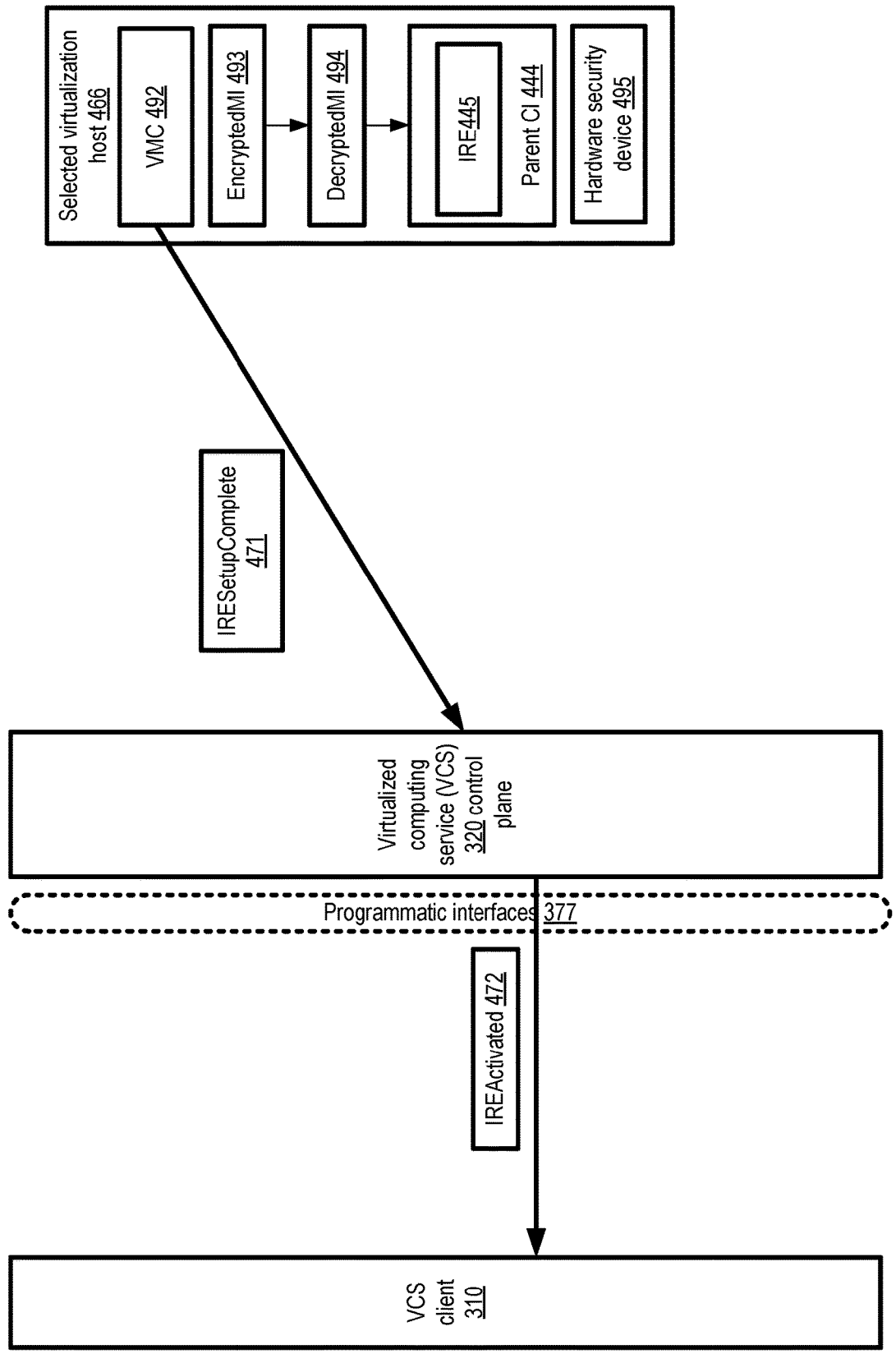

FIG. 4 and FIG. 5 collectively illustrate an overview of a workflow for the instantiation of isolated run-time environments within compute instances at attested virtualization hosts, according to at least some embodiments. Preliminary operations similar to those discussed in the context of FIG. 3 are assumed to have been completed before the operations shown in FIG. 4 and FIG. 5 are begun.

VCS client 310 may submit a LaunchIREAtAttestedHost request 401 to the VCS 320 in the depicted embodiment via programmatic interfaces 377, indicating that an IRE is to set up at a pre-attested host. A virtualization host selector 491 (e.g., part of the VCS control plane) may identify a candidate virtualization host 466 for the client's IRE in the depicted embodiment. Because of the requirement for automated pre-attestation, a host that includes a hardware security device 495 that is capable of generating log records that can be presented as evidence of the Phase-1 operations for instantiating an IRE may be selected as the candidate virtualization host. An encrypted machine image (EncryptedMI) 493, e.g., an image that was previously provided or indicated by the client, may be transferred to the selected virtualization host 466 in the depicted embodiment, so that the machine image can later be used to launch the parent compute instance of the IRE by a virtualization management component (VMC) 492 such as a hypervisor. In some embodiments, an internal LaunchIREUsingEncryptedMI message 403 may be sent from the VCS control plane to the VMC 492.

Evidence that the Phase-1 operations of the IRE instantiation have been completed at the selected virtualization host, such as one or more log records 407 generated by the hardware security device 495, may be sent to a client-selected automated resource verifier (ARV) 370 in the depicted embodiment. There, the evidence may be validated, e.g., by comparing it to valid examples (such as example log records sent during preliminary handshake exchanges by the VCS) of the evidence, and a decision may be made as to whether to approve the selected host or not. If a decision is made to approve the host, a HostApproval message 408 may be transmitted to the VMC 492, e.g., either directly or via an intermediary in the depicted embodiment.

Having received an indication that the selected virtualization host has been approved by the ARV 370, the VMC 492 may extract a decrypted version (DecryptedMI 494) from the EncryptedMI 493 in at least some embodiments, as shown in FIG. 5. The decrypted machine image 494 may then be used to launch the parent compute instance (ParentCI) 444, and its child IRE 445 at the selected virtualization host in at least some embodiments. In the embodiment depicted in FIG. 5, an IRESetupComplete message 471 may be transmitted from the virtualization host 466 to the VCS 320, and a message 372 indicating that the IRE has been activated may be sent to the client 310.

Example IRE Configuration Verification Interactions

Figure 6:
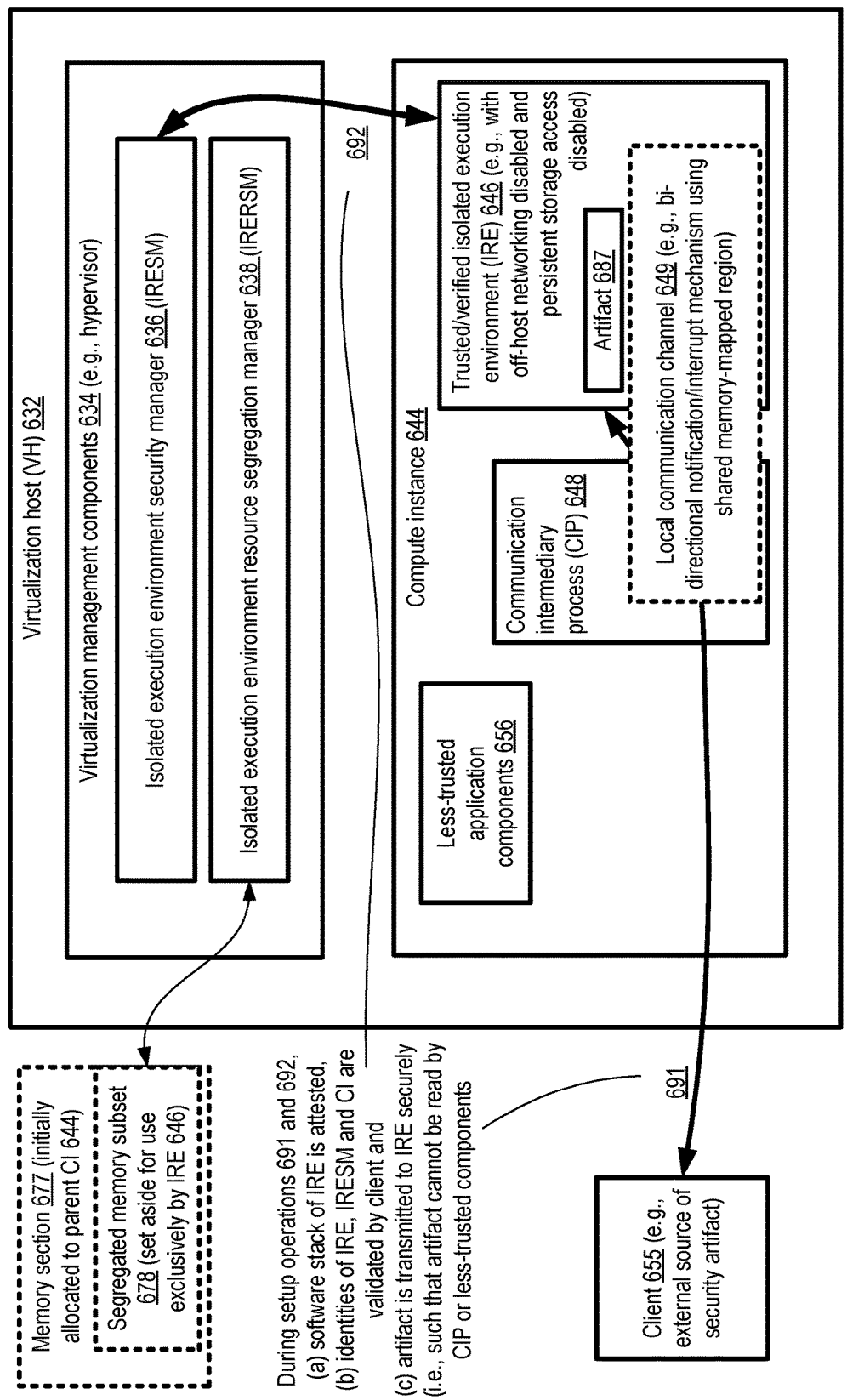
FIG. 6 illustrates an overview of example interactions for verifying the configuration of an isolated run-time environment at a compute instance of a virtualization host, according to at least some embodiments.

In addition to verifying the configuration of the underlying host and its virtualization management components using the evidence generated by the hardware security device, in at least some embodiments operations to further verify the IRE itself (e.g., the software running within the IRE) may be performed after the parent compute instance has been set up. FIG. 6 illustrates an overview of example interactions for verifying the configuration of an isolated run-time environment at a compute instance of a virtualization host, according to at least some embodiments. In the depicted embodiment, a client 655 may submit a request to instantiate a compute instance with an IRE, e.g., to the control plane of a virtualized computing service (VCS) similar to VCS 110 of FIG. 1, resulting in the establishment of compute instance 644 on a pre-attested virtualization host 632. Either based on parameters of the request to launch the compute instance, or based on a separate programmatic request, an isolated run-time environment (IRE) 646 may be set up in various embodiments, with some of the resources that were earlier allocated to the compute instance 644 (the "parent" compute instance of the IRE) being carved out or segregated for exclusive use by the IRE. In at least some embodiments, a client may indicate at least a portion of the desired software stack to be used at the IRE, e.g., by providing a virtual machine image for the IRE itself, by selecting from a set of software stacks supported by the VCS, and so on.

Virtualization management components 634 of the virtualization host 632 may include an IRE resource segregation manager (IRERSM) 638 responsible for identifying resources to be configured for exclusive use by the IRE (by threads or processes launched within the IRE) in at least some embodiments. For example, from the memory section 677 initially allocated to the parent compute instance 644, the IRERSM 638 may select or identify a memory subset 678 for exclusive use by the IRE; as and when additional IREs are set up within the same parent CI, the IRERSM 638 may set aside respective additional subsets exclusively for such IREs. The segregated memory may not be accessible to processes/programs running within the parent CI after it has been configured for IRE use in such embodiments. A subset of other resources, such as virtual CPUs that may have been designated for use by the parent compute instance 644, may also be designated for exclusive use by the IRE in some embodiments.

Within the compute instance, a communication intermediary process (CIP) 648 may be instantiated in various embodiments. An operating system daemon may be used as the CIP in some embodiments. In one embodiment, such a CIP daemon may be established as part of the procedure of establishing the IRE 646; in other embodiments, the CIP daemon may be started up as part of the initialization or boot sequence of the parent compute instance 644, or in response to invocation of an API after the compute instance has booted. The CIP 648 may be configured to transfer data to the IRE 646 from any other entities that wish to communicate with the IRE (e.g., including the client 655), and to transfer outbound data from the IRE 646 to one or more destinations (e.g., including the client 655) in various embodiments. As part of the configuration steps to ensure the isolation of the IRE from any external entities (e.g., other than the hypervisor 634), processes/programs of the IRE 646 may not be permitted to transfer data to any entity or endpoint over a network connection that uses a network interface card of the virtualization host in at least some embodiments; all communications to/from the IRE may have to pass through the CIP in such embodiments. Similarly, in some embodiments configuration settings of the IRE 646 may also prohibit interactions between the IRE and persistent storage, and between the IRE 646 and a file system—that is, reads from and writes to persistent storage may not be permitted from processes/programs of the IRE in such embodiments. A local communication channel 649 may be set up for data transfers between the CIP and the IRE in at least some embodiments. For example, a portion of shared memory which is accessible to both the CIP and the IRE may be designated to store data being transferred in/out of the IRE in one embodiment. A bi-directional notification or interrupt-based mechanism may be used to indicate when data is ready to be read by the IRE (for data inbound to the IRE) or read by the CIP (for data outbound from the IRE) in some embodiments. The compute instance 644 may comprise various other processes/programs such as application components 656 and/or operating system components of the compute instance, which may be less trusted (from the perspective of the client) than the IRE with respect to performing computations using security artifacts such as cryptographic keys in the depicted embodiment.

In at least some embodiments, to obtain additional evidence of the trustworthiness of the software being used at IRE 646, a client 655 (e.g., an external source of a security artifact to be used at the IRE for computations) may issue a configuration verification query, e.g., to the VCS control plane or to the compute instance 644 as indicated by arrow 691. The query may, for example, include a random number or nonce in the depicted embodiment; the client 655 may later confirm that the same nonce is included in a response to the query. The query may be received at the CIP 648, which may in turn pass on the query to the IRE. An IRE security manager (IRESM) 636 may determine that the query has been directed to the IRE 646, e.g., based on an indication provided by the CIP 648 or the IRE 646. The IRESM 636 may then perform configuration verification/analysis operations on the software stack of the IRE 646, as indicated by arrow 692. In some embodiments, for example, one or more hash functions may be applied to various layers of the software of the IRE 646, and the output hash values may represent a signature of the software stack. In at least some embodiments, the IRESM 636 may perform attestation of the IRE software stack. The results of the configuration measurements/verification tests employed by the IRESM 636 may be provided to the client 655 in the depicted embodiment, e.g., via a reverse traversal of the path taken by the query submitted from the client 655. The results may be passed from the IRESM to the IRE, from the IRE to the CIP, and eventually to the client in such a scenario. In other embodiments, a different path may be used for the verification results than was used for the query. In at least some embodiments, in addition to the IRE software verification results and the nonce, the client 655 may also be provided (a) an indication of the identity of the IRESM, similar to a TLS certificate rooted at a trusted certificate authority and (b) an indication of the identity of the IRE and/or its parent compute instance (e.g., comprising one or more public keys of respective asymmetric key pairs). The client 655 may then verify that the attestation results and the identity information is acceptable, and if so, the IRE may be designated as being trusted and verified for computations that use one or more of the client's security artifacts. In some embodiments, the client may provide one or more hash values representing acceptable software configurations to the VCS, and the security manager may compare the results of its analysis of the IRE software with such acceptable hash values on the client's behalf; that is, the hash-value-based verification of the IRE software state may be performed at the hypervisor itself in such embodiments.

Figure 7:
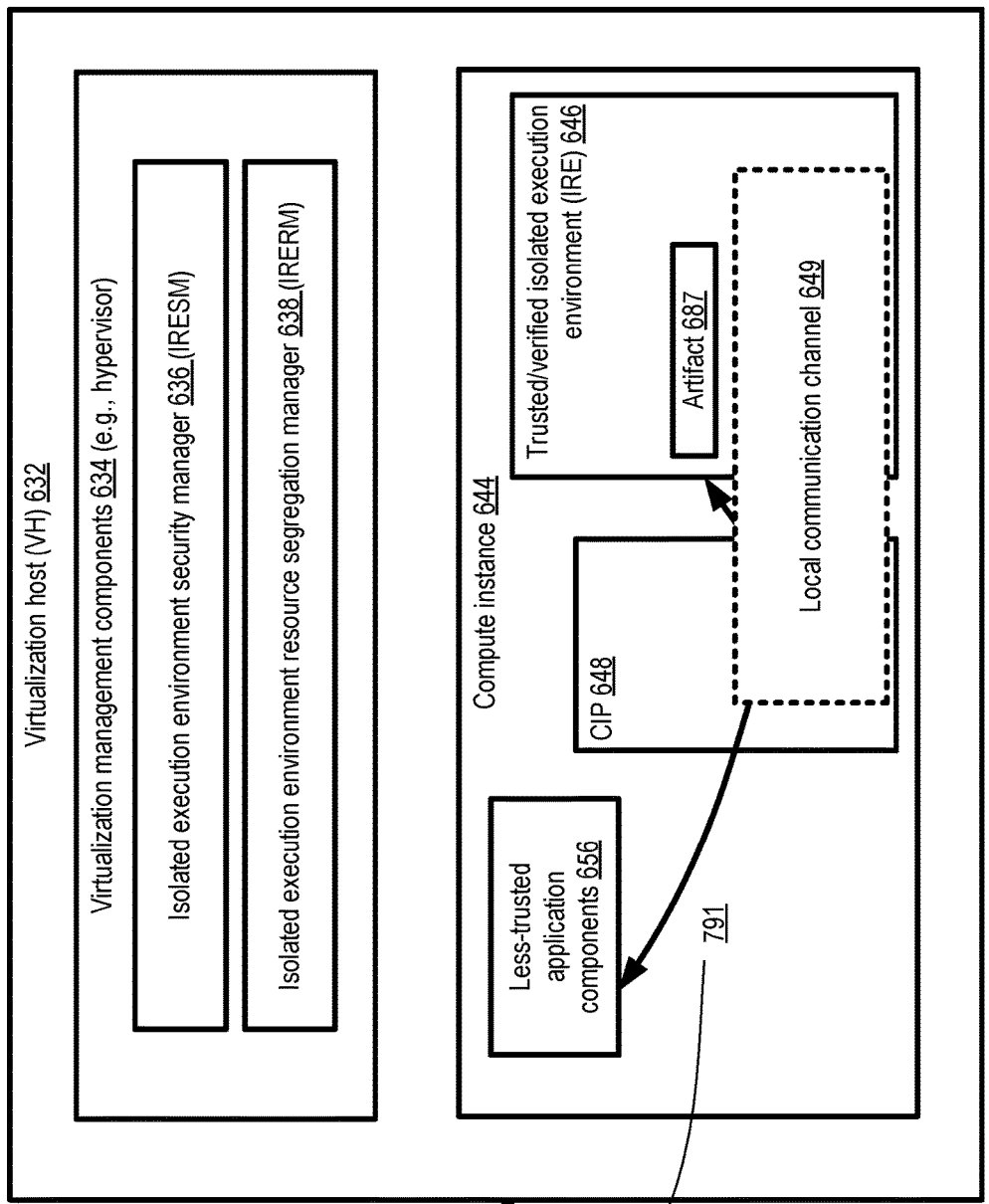
FIG. 7 illustrates an overview of an example request/response workflow for computations performed at an isolated run-time environment using a security artifact, according to at least some embodiments.

At this stage of the workflow illustrated in FIG. 6, one or more security artifacts 687 may have to be transferred from the client (or from some other source selected by the client) to the IRE for some types of applications. In order to do so, a secure communication session or channel, similar to a TLS session, may be established between the client (or artifact source) and the IRE in various embodiments. Within the compute instance 644, the CIP and local communication channel 648 may be used for such a secure session. Using one or more messages of the session, an encrypted version of the security artifact(s) 687, which cannot be decrypted by the CIP even though the CIP passes on the messages of the session to/from the IRE, may be transferred safely to the IRE 646. The IRE 646 may then begin performing computations using the artifact(s) 687, as illustrated in FIG. 7. In some cases, security artifacts 687 may not be needed for at least some of the applications run at an IRE.

Example Request/Response Workflow Using Security Artifacts

FIG. 7 illustrates an overview of an example request/response workflow for computations performed at an isolated run-time environment using a security artifact, according to at least some embodiments. After setup operations similar to those discussed in the context of FIG. 6 are completed, in which a VCS client verifies that an isolated run-time environment (IRE) has the appropriate software configuration for the client's application, and security artifacts to be used to perform computations of the application on behalf of the client are provided to the IRE without being made visible or accessible to other software running at the virtualization host, the IRE may be ready to perform the computations.

In at least some embodiments, components of the client's application which do not need to access the security artifacts may also be run at the parent compute instance 644. Such less-trusted components 656 may, for example, have access to data sets on which the subsets of the application's computations that require the use of a security artifact 687 are to be performed. The less-trusted components 656 may in some cases also be responsible for obtaining results of the IRE's computations, for further processing or analysis locally, and/or for transferring to some external endpoint. In at least some embodiments, a request-response workflow corresponding to arrow 791 may be implemented at the compute instance 644, in which the application components submit requests for computations to the IRE 646 (via the CIP 648 and the local communication channel 649), the IRE performs the requested computations using the security artifact 687, and the results of the computations are provided to the application components 656. The data sets (if any) on which the computations are to be performed may also be provided to the IRE via the local communication channel 649 in various embodiments. For example, if some type of transformation or extraction operations are to be performed on a digital media object (such as a video or an audio file) using a cryptographic key, the digital media object may be conveyed to the IRE 646 via the local communication channel, and the results of the transformation/extraction may be conveyed back to the application components 656 via the local communication channel as well in at least some embodiments. In scenarios in which large data sets have to be transferred from the less-trusted application components 656, the use of in-memory mechanisms (such as the buffers mentioned earlier) for the local communication channel 649 may enable very high transfer bandwidths and very low transfer latencies, especially when compared to the bandwidth and/or latencies achievable if the data sets were transferred over network connections. Note that other models of performing secure computations at the IRE may be employed in some embodiments—e.g., clients may submit requests for at least some computations from remote devices instead of relying on local application components 656, or programs/processes included in the IRE software stack may perform application computations as soon as the artifact 687 is obtained, without requiring any additional requests or data sets to be submitted.

Example Additional Programmatic Interactions

Figure 8:
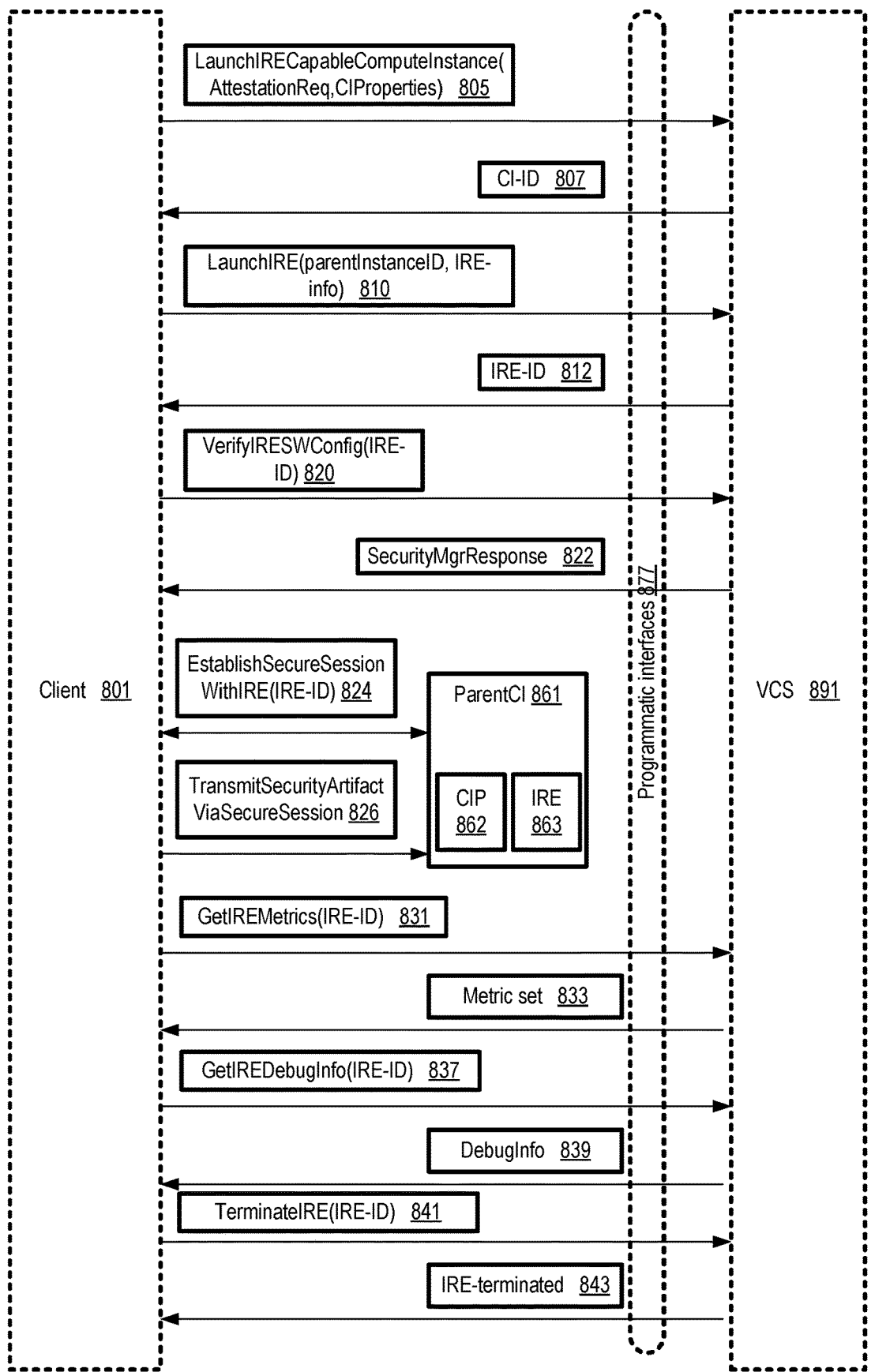
FIG. 8 illustrates example additional programmatic interactions related to the configuration and use of isolated run-time environments, according to at least some embodiments.

FIG. 8 illustrates example additional programmatic interactions related to the configuration and use of isolated run-time environments, according to at least some embodiments. The kinds of interactions illustrated in FIG. 8 may be supported by a VCS 891, similar in features and functionality to VCS 110 of FIG. 1, in addition to or instead of the programmatic interactions discussed earlier (e.g., the messages discussed in the context of FIG. 3, FIG. 4 and FIG. 5) in at least one embodiment.

In some embodiments, a two-step approach may be employed with regard to instantiating or launching isolated run-time environments or IREs. A client 801 may first submit a request to launch a parent compute instance (e.g., a LaunchIRECapableComputeInstance request 805) to the VCS 891, and then later issue a request to launch the IRE itself (e.g., a LaunchIRE request 810) within the parent compute instance (CI). In such an approach, automated pre-attestation requirements (if any) for the virtualization host may be indicated (e.g., via the AttestationReq parameter), and various desired characteristics of the parent compute instance may be indicated (e.g., via the CIProperties parameter) in the first of the two requests. For example, if pre-attestation of the kind discusses earlier is desired, the AttestationReq parameter may indicate one or more client-selected pre-registered resource verifiers. The CIProperties parameter may be used to indicate, for example, the memory size of the desired compute instance, the kind of operating system to be used for the compute instance, etc. After the VCS has launched a CI with the requested properties, an identifier CI-ID 807 of the compute instance may be provided to the client.

The CI identifier (CI-ID) may be included in the request 810 to launch the IRE in the depicted embodiment, e.g., along with information (IRE-info) about the contents and configuration of the IRE itself, such as the amount of the parent CI's memory and/or other resources to be set aside for the IRE. In some embodiments a pointer to an executable object such as a virtual machine image or a software container executable to be used in the IRE may be provided as a parameter of the LaunchIRE request. In at least one embodiment, a program to be launched as the IRE may be transferred to the parent compute instance by the client 801 before the LaunchIRE request is submitted, and an indicator of the name or location of the program may be provided in the IRE-info parameter. In an embodiment in which this two-step procedure is used along with automated attestation, the virtualization host may be attested by a client-selected resource verifier (e.g., using evidence of Phase-1 operations of IRE setup) prior to the launch of the parent compute instance; however, at least some of the Phase-2 operations of IRE establishment discussed earlier may be deferred until the LaunchIRE request is received. An identifier of the IRE (IRE-ID 812) may be returned to the client after the IRE is instantiated in some embodiments. In other embodiments, instead of a two-step IRE establishment procedure, a single request (similar to the LaunchIREAtAttestedHost request 401 of FIG. 4) may be used to launch both the parent compute instance and the child IRE within the parent compute instance, in effect combining the requests 805 and 810 into a single request.

A VerifyIRESWConfig request 820 may be submitted by a client 801 to initiate the process of attestation/analysis/verification of the software state of the IRE itself (e.g., separately from the attestation of the virtualization host) in some embodiments, with an identifier of the IRE being included as a parameter of the request. In response, a security manager implemented within a virtualization management component of the host at which the IRE is set up may perform a set of measurements on the software, as discussed earlier, and generate a response (SecurityMgrResponse 822) in such embodiments. The SecurityMgrResponse 822 may include the results of the attestation/analysis/verification, as well as evidence of the identity of the security manager, the IRE and/or the parent compute instance in some embodiments.

A client 801 may establish a secure communication session or channel with the IRE, e.g., using one or more messages indicated by EstablishSecureSessionWithIRE 824. A handshake protocol conceptually similar to a TLS session establishment handshake may be employed in some embodiments—e.g., both parties to the session may obtain indications of the other party's identity, agree on a ciphersuite to be used, and so on. Messages of the handshake originating at the client 801 may be transmitted to a communication intermediary process CIP 862 of the parent compute instance ParentCI 861, and from that CIP to the IRE 863; messages from the IRE 863 to the client may take the reverse path. After the secure communication session has been established, one or more security artifacts may optionally be transmitted by the client to the IRE in one or more messages (indicated by TransmitSecurityArtifactViaSecureSession 826) of the session, e.g., in encrypted form such that the artifacts cannot be extracted or obtained by any software of the parent CI other than software running in the IRE. After the artifacts have been decrypted at the IRE, computations of the client's application that require the use of the artifact may be performed at the IRE in various embodiments as discussed above.

Figure 9:
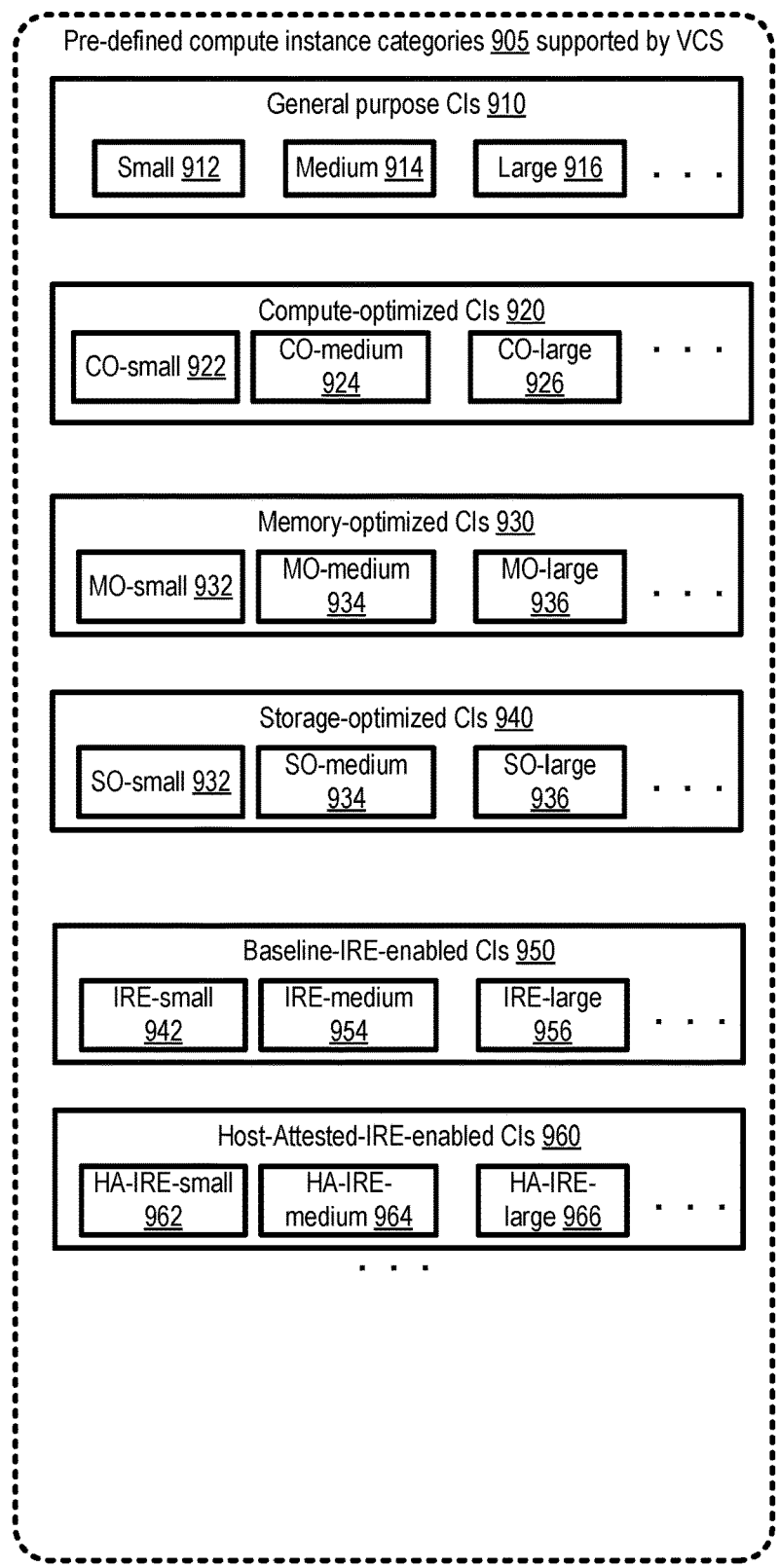
FIG. 9 illustrates example categories of compute instances that may be established at a virtualized computing service, according to at least some embodiments.

Clients 801 may request metrics pertaining to an IRE, such as resource utilization metrics, data transfer metrics, etc., specific to the IRE and the like using a GetIREMetrics request 831 in some embodiments, and the requested metric sets 833 may be provided by the VCS in response. In some embodiments, debugging information of an IRE (e.g., a call stack associated with a process that exited unexpectedly, or a dump of memory of the IRE) may be requested via a GetIREDebugInfo request 837, and the requested information may be provided if available via a DebugInfo message 839. In at least some embodiments, a client may request, via a TerminateIRE request 841, that a particular IRE be shut down or killed. Such a termination may be performed, and an IRE-terminated response 843 may be provided in some such embodiments. Note that other types of programmatic interactions associated with isolated run-time environments may be supported in at least some embodiments, and some of the types of requests shown in FIG. 3, FIG. 4, FIG. 5 or FIG. 8 may not be supported in at least one embodiment.
Example Categories of Compute Instances In some embodiments, a virtualized computing service may enable clients to select from among a variety of types of supported compute instances, some of which may enable clients to request the establishment of isolated run-time environments of the kind introduced above. FIG. 9 illustrates example categories of compute instances that may be established at a virtualized computing service, according to at least some embodiments. When requesting a compute instance, in the depicted embodiment a VCS client may specify the particular pre-defined category 905 to which the requested compute instance (CI) is to belong. In some embodiments, the VCS may also allow clients to provide client-defined specifications for a requested CI, e.g., in scenarios where the pre-defined categories do not meet client requirements.

The standardized set of compute instance categories 905 may be subdivided into families, such as a general-purpose CIs family 910, a compute-optimized CIs family 920, a memory-optimized CIs family 930, a storage-optimized CIs family 940, and at least two IRE-enabled families: a baseline-IRE-enabled family 950 (compute instances that can support isolated run-time environments similar to those introduced above at hosts for which automated attestation is not required), and a Host-Attested-IRE-Enabled family 960 (for which automated pre-attestation using client-selected resource verifiers is performed as discussed above) in some embodiments. Depending on the known or estimated needs of the application for which a given CI is to be used by the client, a CI type from the appropriate family may be selected. The relative resource capabilities for the different CI types may be expressed using units selected or defined by the VCS—e.g., for computing, units such as virtual CPUs that are roughly performance-equivalent to a particular well known processor running at a particular clock speed may be defined. The family may be selected based on qualitative considerations (e.g., answers to question such as "Do the applications to be run on the CIs require computations to be performed using security artifacts such as encryption keys?", "Is the application mix more memory-intensive or more compute-intensive?", etc.), while the particular CI type within the family (e.g., small 912 vs. medium 914 vs. large 916 in the general purpose family) may be selected based on considerations such as desired performance levels, cost, and so on. Compute-optimized CIs 920, such as CO-small CIs 922, CO-medium CIs 924, or CO-large CIs 926 may, for example, be implemented using hosts with more and/or faster processors or cores than the general purpose CIs in the depicted embodiment. In the memory-optimized CIs 930 such as MO-small CIs 932, MO-medium CIs 934, or MO-large CIs 936, the amount of memory (e.g., the number of gigabytes of memory per virtual CPU) relative to the computing capability may be higher than in compute-optimized CIs 920 or the general-purpose VMs. Similarly, in the storage optimized family 940 comprising SO-small CIs 932, SO-medium CIs 934, and SO-large CIs 936, the ratio of local storage to compute power (e.g., number of gigabytes of local solid-state device (SSD) storage per virtual CPU) may be higher than in the other families.

Figure 10:
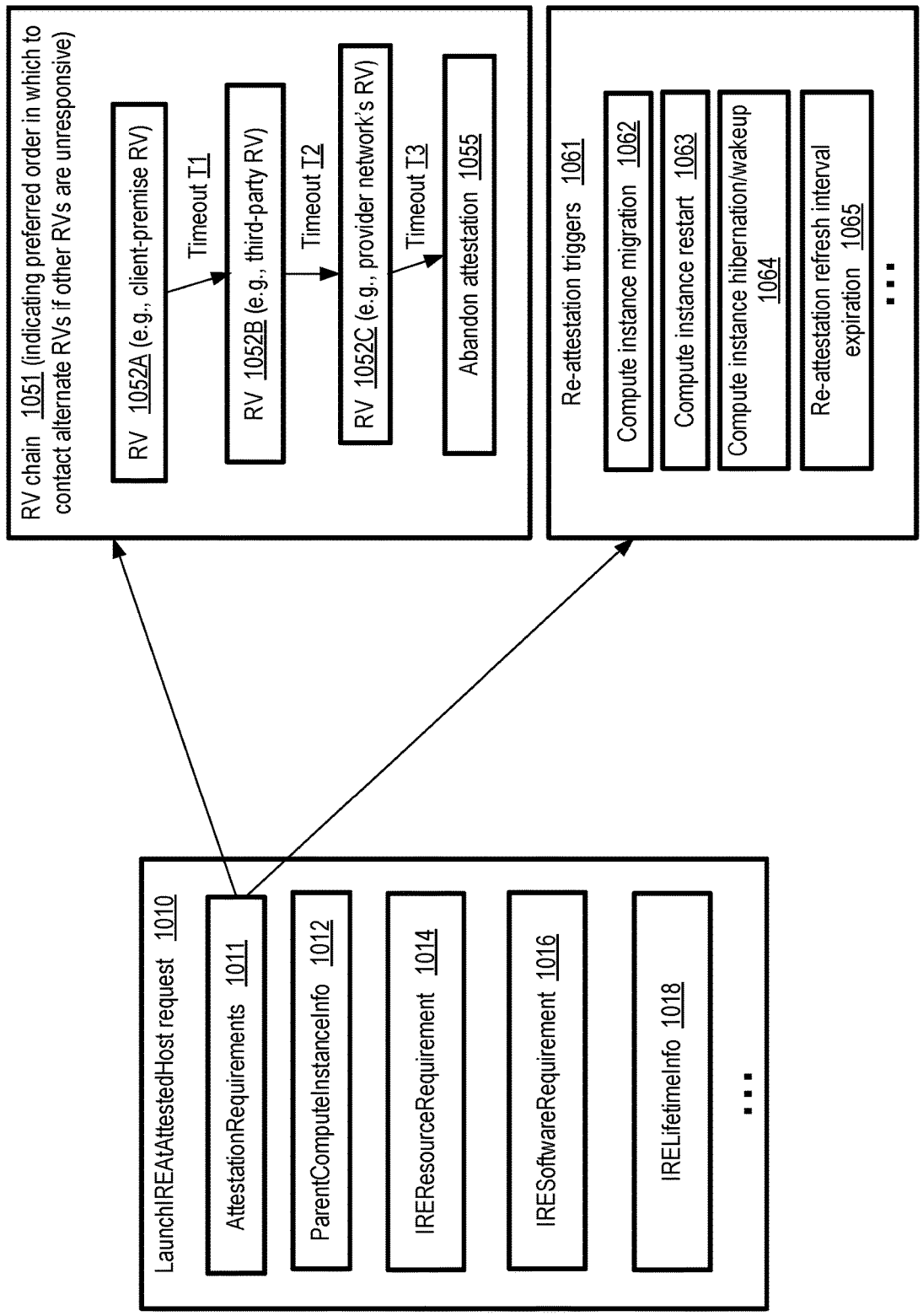
FIG. 10 illustrates examples elements of a request to instantiate an isolated run-time environment, according to at least some embodiments.

The Baseline-IRE-enabled CIs 950 (such as the IRE-small CIs 942, the IRE-medium CIs 954 or the IRE-large CIs 956), as well as the Host-Attested-IRE-enabled CIs 960 (such as the HA-IRE-small CIs 962, the HA-IRE-medium CIs 964 or the HA-IRE-large CIs 966) may differ from one another in their memory and/or computing capabilities as well. In at least one embodiment, the virtualization hosts of the VCS may include several different types of virtualization management software and/or or offloading hardware combinations: e.g., some hosts may have a hypervisor H1 and no offloading cards for virtualization management tasks, other hosts may have a different hypervisor H2 and one or more offloading cards which perform networking and storage-related virtualization management tasks, other hosts may have special hardware security devices that generate log records similar to those discussed earlier, and so on. In one such embodiment, baseline-IRE-enabled CIs 950 may be established on a subset of the VCS virtualization hosts that have a particular hypervisor designed or hardened for compute instances at which sensitive data is to be processed, but may not necessarily have the hardware security devices. In some embodiments, Host-Attested-IRE-enabled CIs 960 may be established on a subset of the VCS virtualization hosts that have the hardened hypervisor as well as the hardware security devices. In at least one embodiment, special categories of IRE-enabled CIs may not necessarily be defined or made available to VCS clients; instead, IREs may be set up at CIs of one or more other pre-defined categories or at client-specified custom CIs that do not belong to the pre-defined categories.
Example Request Parameters for Instantiating Isolated Run-Time Environments FIG. 10 illustrates examples elements of a request to instantiate an isolated run-time environment, according to at least some embodiments. A LaunchIREAtAttestedHost request 1010, which may be submitted by a client of a virtualized computing service (VCS) similar to VCS 110 of FIG. 1, may comprise a number of fields or elements in the depicted embodiment. AttestationRequirements 1011 may indicate, for example, a chain 1051 comprising one or more resource verifiers (RVs) selected by the client in some embodiments. The example RV chain 1051 shown in FIG. 10 includes three RVs, to be consulted in sequence if necessary before the VCS stops attempting to obtain approval regarding a candidate virtualization host using log records and/or other evidence generated at a security device. Network addresses of RVs 1052A, 1052B and 1052C (as well as other metadata usable to establish communications with the RVs from the VCS, such as login credentials, keys or the like) of the chain may be provided by the client in at least some embodiments. The VCS may first attempt to obtain host approval from RV 1052A (e.g., an RV set up at a client premise outside the provider network) for a given host identified for the IRE to be launched. If no response is received from RV 1052A within a timeout period T1, RV 1052B (managed in this example by a third-party approved by the client) may be contacted. If RV 1052B also fails to respond, e.g., within a timeout period T2, a third RV 1052C (e.g., implemented within the provider network of the VCS) may be contacted. If the third RV also fails to respond within a timeout T3, the attempt to obtain an attestation or approval of the virtualization host may be abandoned in the depicted embodiment, as indicated in element 1055. RV chains of any desired length may be indicated by a client in some embodiments; the respective timeouts such as T1, T2, T3 etc. may be selected by the client or by the VCS.

AttestationRequirements 1011 may also optionally include a list of one or more re-attestation triggers 1061 in some embodiments, indicating respective scenarios or conditions under which the configuration of a virtualization host being used (or to be used) for an IRE is to be re-verified or re-attested. For example, in some embodiments, if and when the parent compute instance and/or the IRE is migrated to another virtualization host, the migration 1062 is only permitted if the destination virtualization host (the host to which the IRE is being moved) is pre-approved by an RV of the RV chain 1051. In such an embodiment, evidence such as log records generated by a security device of the destination virtualization host may be provided to the RV as a prerequisite for migration, and the IRE may be migrated after an automated approval message or token is received from an RV of the chain. In one embodiment, a client may wish to have the virtualization host configuration verified at every parent compute instance restart/reboot 1063, and/or every time the compute instance undergoes a hibernation/wakeup cycle 1064. In at least some embodiments, a client may wish to have the virtualization host configuration attested periodically (e.g., after an expiration of a refresh interval 1065 selected by the client), independently of whether/when lifecycle transitions such as migrations, restarts, hibernations etc. are scheduled.

A ParentComputeInstanceInfo field 1012 may indicate the identifier of a previously-created compute instance in some embodiments. In other embodiments, the ParentComputeInstanceInfo field may indicate a category of compute instances (e.g., such as the HA-IRE-small, HA-IRE-medium or HA-IRE-large categories discussed in the context of FIG. 9), and in response to the request 1010 the VCS may be responsible for first launching an instance of that category, and then launching an IRE within it—that is, a single request may result in the establishment of the parent CI as well as the IRE within the parent CI. In one embodiment, instead of specifying a pre-existing category of CIs, the client may indicate a combination of desired properties of the parent CI (e.g., a processing capacity, a memory size, an operating system version, and so on) via the ParentComputeInstanceInfo field 1012.

In some embodiments, an IREResourceRequirement field 1014 may be used to indicate the fraction (or actual amount) of the parent CI's resources that are to be set aside for exclusive use by the IRE. For example, in one embodiment in which the parent CI has G gigabytes allocated, the field 1014 may indicate that 25% of the parent CI's memory is to be set aside for the IRE. In other embodiments, instead of specifying a fraction or percentage, the absolute amount of memory (and/or other resources, such as virtual CPUs or the like) to be set aside for the IRE may be indicated.

The desired software stack to be used for the IRE, such as an operating system version, a set of application programs and the like to be included in the IRE, may be indicated via the IRESoftwareRequirement field 1016 in the depicted embodiment. In some embodiments, a virtual machine image to be used for the IRE, or a software container to be used for the IRE, may be indicated via an identifier. In some embodiments, a virtual machine image or other executable object for launching the IRE may be transmitted to the VCS in a separate interaction; such an object may be stored for example at a repository of the VCS control plane, or using storage of the parent CI.

According to at least one embodiment, a client may indicate guidelines about how long the IRE is to remain operational, e.g., via an IRELifetimeInfo parameter 1018 of the launch request 1010. For example, to further reduce the probability of the security artifacts (which may be provided to the IRE and used at the IRE for computations on behalf of the VCS client as discussed earlier) being obtained or accessed by unauthorized entities, a client may indicate that an IRE is to be automatically terminated T minutes after it is launched. In other embodiments, a client may indicate that the IRE is not to be terminated in advance of its parent CI. In some embodiments, other client preferences regarding IRE configuration and usage may be indicated via parameters of IRE launch requests than those shown in FIG. 10. In at least some embodiments, default values for some or all of the parameters of IREs may be used by the VCS in a scenario where a client does not provide values—e.g., a default amount of memory may be set aside for the IRE, a default maximum lifetime parameter setting may be used for an IRE, a default set of re-attestation triggers may be used, and so on.

In some embodiments, information about attestation/verification of the hosts to be used for a client's IREs may be submitted separately from IRE launch requests. For example, the equivalent of an RV chain 1051 and/or a list of re-attestation or re-verification triggering conditions may be specified in an AttestationRequirements message by a client, and the information provided in such a message may then be used for subsequent IRE launches for the client.

Methods for Establishing and Using Isolated Run-Time Environments

Figure 11:
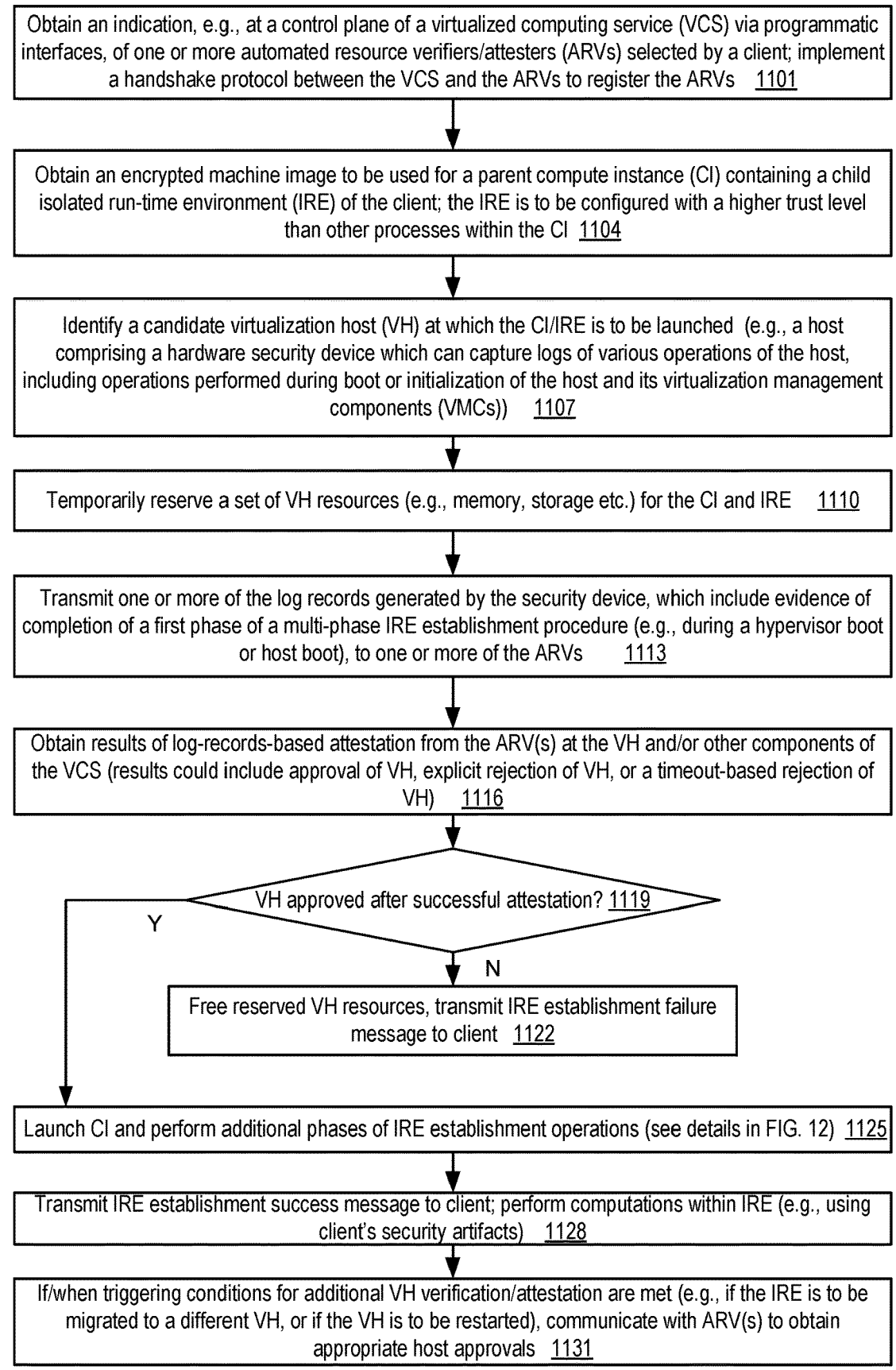
FIG. 11 and FIG. 12 are flow diagrams illustrating aspects of operations that may be performed to establish and use isolated run-time environments at automatically-attested hosts of a virtualized computing service, according to at least some embodiments.
Figure 12:
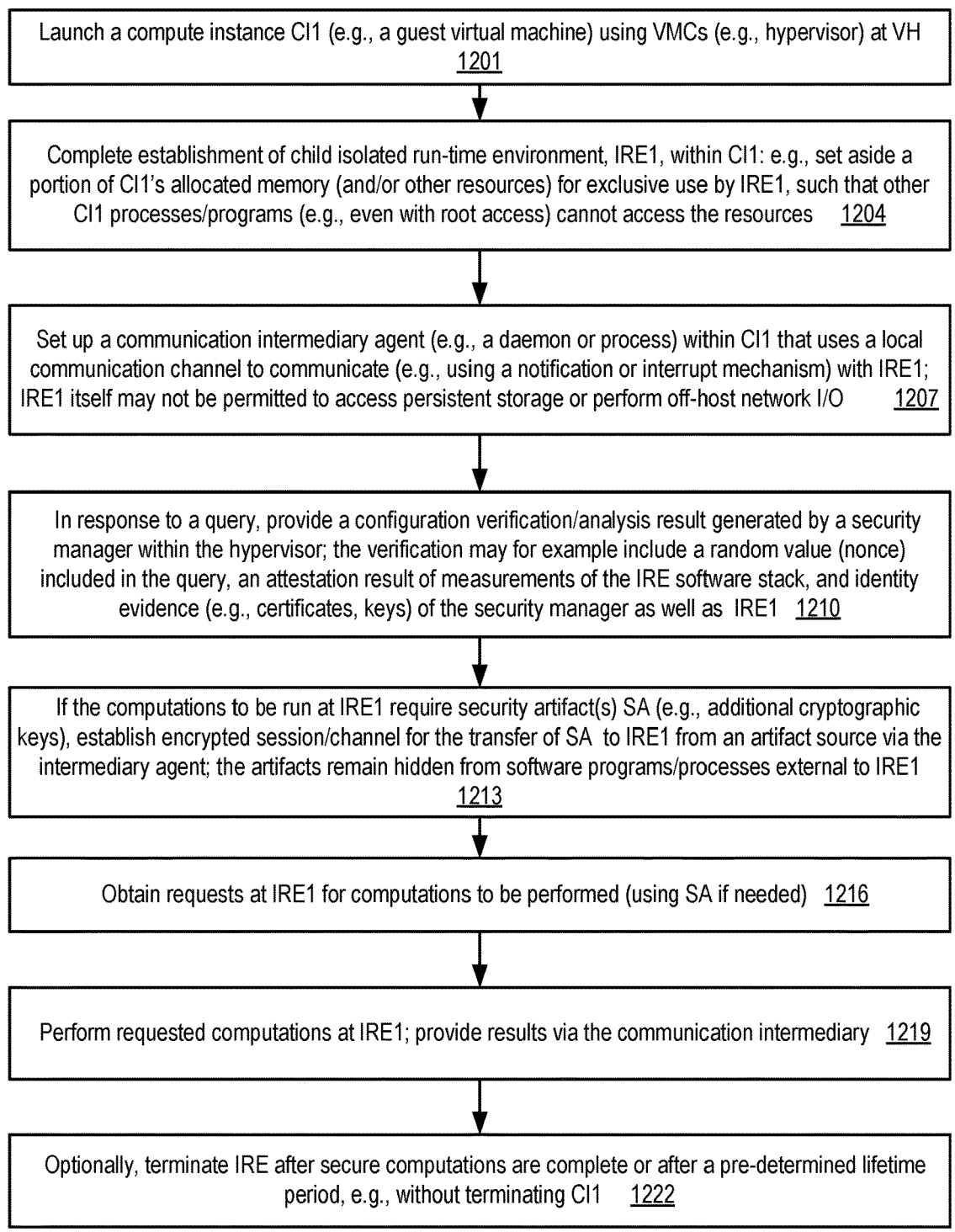

FIG. 11 and FIG. 12 are flow diagrams illustrating aspects of operations that may be performed to establish and use isolated run-time environments at automatically-attested hosts of a virtualized computing service, according to at least some embodiments. As shown in element 1101 of FIG. 11, an indication of one or more automated resource verifiers (ARVs) selected by a client may be obtained at a VCS similar in features and functionality to CVCS 110 of FIG. 1, e.g., via programmatic interfaces of the VCS control plane. A wide variety of ARVs may be specified by a client, including some that comprise programs running at client-owned or client premises, others that comprise programs run using third-party resources or premises, and/or ARVs that include programs run at a service of the provider network of which the VCS is a part. In one embodiment, a chain of ARVs similar to that discussed in the context of FIG. 10 may be specified by a client, indicating a preferred order in which alternate ARVs are to be requested to provide host approval if other ARVs are non-responsive, and the timeout intervals after which such alternate requests are to be initiated. In response to receiving the information (including for example network addresses) of the client's preferred ARVs, the VCS may initiate a handshake procedure to register the ARVs, similar to the procedure discussed in the context of FIG. 3. In such a handshake procedure, in some embodiments, examples of log messages or other artifacts that can be used by the ARVs to attest or approve the configuration of a candidate virtualization host for an IRE may be provided to the ARVs, and the ARVs in turn may provide examples of host approval tokens/messages to the VCS. At the end of a successful handshake sequence with a given ARV (which may comprise one or more messages in either direction between the VCS and a given ARV), the ARV may be included in a registry or list of trusted ARVs maintained for various clients at the VCS in various embodiments.

A client may provide an indication, to the VCS via a programmatic interface, of an encrypted machine image to be used for a parent compute instance (CI) within which a child IRE is to be set up in the depicted embodiment (element 1104). The IRE may represent an execution environment at a higher trust level than the other processes running within the parent compute instance. In at least some embodiments, the establishment of the IRE may involve multiple phases of operations, some performed during the boot/initialization of the virtualization host being used for the IRE, and some performed later.

A candidate virtualization host (VH) at which a CI/IRE combination is to be set up for the client may be identified at the VCS (element 1107), e.g., in response to a programmatic launch request. If the VCS determines that pre-attestation of the VH is required (e.g., based on preferences or parameters provided by the client), a candidate VH that includes a security device (e.g., similar to a trusted platform module or TPM) which logs various operations may be selected. For example, the security device may record operations performed during the boot/initialization processes of the VH and/or its virtualization management components (VMCs), which may provide evidence that a preliminary or first phase of establishment of the IRE has been completed. Other types of security devices, including for example software security devices comprising one or more processes/threads running at the CPUs of the VH or at a peripheral card of the VH, may be used in at least one embodiment.

In some embodiments, a set of VH resources (e.g., memory, storage, virtual CPUs, etc.) that may be used by the parent CI may be reserved temporarily (element 1110). Such reserved resources may be allocated to the CI if the candidate VH is approved by an ARV selected by the client; if such approval is not obtained in a timely manner (e.g., based on timeout values selected by the VCS and/or the client), the reserved resources may later be freed as indicated in element 1122. A set of log records generated by the security device, indicating that at least one phase of IRE establishment has been completed, may be transmitted to one or more of the ARVs (element 1113) in the depicted embodiment.

Explicit or implicit results of the log-records-based attestation/verification at the ARV(s) may be obtained at the candidate VH (element 1116) in various embodiments, e.g., either directly or via the VCS control plane. Explicit results may include, for example, one or more approval messages/tokens (in some implementations including a cryptographic key that can be used to decrypt the machine image), and/or a message rejecting the candidate virtualization host. If no response is received from the ARV(s) within a selected timeout interval, and all available ARVs indicated by the client have been exhausted, this may be considered an implicit rejection of the candidate VH in at least some embodiments. If the candidate VH is approved (as detected in operations corresponding to element 1119), the parent CI may be launched at the candidate VH, and additional phases of IRE establishment may be performed (element 1125). Details of the establishment of the IRE and the transfer of security artifacts (if needed) to the IRE are provided in FIG. 12. Computations for which the IRE was established may be performed at the IRE using such security artifacts in some embodiments (although in some cases, such security artifacts may not be required) (element 1128). In some embodiments, an indication that the IRE has been established may be provided programmatically to the client from the VCS.

According to at least some embodiments, as discussed above in the context of FIG. 10, the ARV(s) may be used to verify the configuration of a VH multiple times with respect to a given IRE, not just when the IRE is established. A number of re-verification or re-attestation triggering conditions may lead to such additional interactions between the VCS and the ARV(s) in one embodiment, such as if/when the IRE (and its parent CI) are to be migrated, if/when the VH being used for the CI/IRE is restarted, and so on. If such a condition is met, approval of the host at which the IRE is to run (e.g., the destination VH for a migration, or the same VH in the case of a reboot) may be re-obtained from the ARV(s) in the depicted embodiment (element 1131).

FIG. 12 shows additional details regarding the establishment and use of isolated run-time environments within compute instances of a virtualized computing service, according to at least some embodiments. As shown in element 1201, a compute instance CI1 (such as a guest virtual machine) may be launched at a virtualization host of a network-accessible computing service. Automated pre-approval/attestation of the virtualization host, based on examination of evidence provided in log records generated by a security device as discussed above, may be obtained prior to establishing the CI in some embodiments. In at least some embodiments, a security-hardened hypervisor may be set up at the host—for example, before the hypervisor is instantiated, firmware of the host may be verified, a secure boot process may be initiated at the host using a virtualization management offloading component, and so on. The hypervisor and/or other virtualization management components of the host) may in turn assign or allocate a portion of the host's memory and/or other resources (e.g., virtual CPUs) to the compute instance, e.g., as part of the launch procedure of the compute instance.

After CI1 is launched, operations to complete the establishment of a child isolated run-time environment IRE1 within CI1 (e.g., using resources that were allocated earlier to CI1) may be performed in various embodiments (element 1204). At least a portion of the particular software stack to be used at IRE1 may be specified or selected by the client on whose behalf IRE1 is set up in various embodiments—e.g., executable versions of programs to be run in IRE1 may be indicated by the client, a machine image or software container image to be used for IRE1 may be indicated by the client, and so on. A portion of the memory that was assigned to CI1 may be carved out or segregated, for example, by the hypervisor, and assigned for exclusive use by processes/programs running within IRE1 in at least some embodiments. In some embodiments, a subset of other types of resources of CI1, such as virtual CPUs, may also be set aside for exclusive use by IRE1. The subset of the parent instance's resources that is set aside for the child run-time environment may not be accessed from other programs/ processes running in CI1, although a region of memory may be shared by IRE1 and a communication intermediary process set up within CI1 in at least some embodiments as discussed below.

In the depicted embodiment, a communication intermediary agent (e.g., an operating system daemon or process) may be established within CI1 for managing interactions between IRE1 and other communication endpoints, data destinations or data sources (element 1207). A number of configuration settings that place severe restrictions on IRE 1's own ability to initiate communications may be generated and/or stored at the virtualization host in various embodiments, resulting in the intermediary being used for any such communications. For example, network communication with endpoints outside the host may be prohibited at IRE1, and/or access to persistent storage may be prohibited at IRE1 in some embodiments by the configuration settings. In some embodiments, for example, the configuration settings may comprise a set of logical or software devices, and the set of devices that are established may exclude devices required for over-the-wire networking, I/O (reads or writes) to file systems, storage volumes and so on. In at least some embodiments, a local shared-memory-based communication channel may be used for transferring data between the intermediary and IRE1—for example, one or more buffers in a region of shared memory mapped to both the intermediary process and a process within IRE1 may be set up. A notification-based or interrupt-based mechanism may be employed in some embodiments for such data transfers, e.g., as opposed to a polling-based technique. For example, when data is to be transferred to IRE1, the intermediary process may write the inbound data to a shared memory buffer and cause the equivalent of an interrupt to be delivered to IRE1, and when data is to be transferred from IRE1, the outbound data may be written to a shared memory buffer by a process within IRE1, and a similar interrupt-like notification may be directed to the intermediary, causing the intermediary to in turn transfer the outbound data on towards its intended destination.

After IRE1 has been established, in at least some embodiments a request or query to verify or analyze the configuration of IRE1 may be received, e.g., from a client on whose behalf IRE1 was set up. In response to such a query, a result obtained from one or more tests, measurements or analysis performed by a security manager on IRE1's software stack may be provided (element 1210). In at least one embodiment, the security manager may be implemented as a subcomponent of the hypervisor running at the virtualization host. In other embodiments, the security manager may run elsewhere, e.g., as a thread of execution within a virtualization management offloading card. In some embodiments, the tests or measurements may comprise an attestation of the software stack of IRE1 (different from the attestation of the virtualization host at which IRE1 is run), and the test results may include a value or values generated by applying one or more selected hash functions or other transformation functions to at least a portion of IRE1's software. In some embodiments, a result message generated by the security manager may comprise, for example, a random value or nonce included in the configuration verification query (which can be used by the query submitter to check that the response corresponds to the query that was submitted), an attestation result corresponding to IRE1's software stack, and identity information/evidence (such as a digital certificate, and/or one or more cryptographic keys) of the security manager itself, and/or identity information pertaining to IRE1. The result message may be conveyed from the security manager via any of various paths to the query submitter in different embodiments—e.g., along a path that includes IRE1 and the communication intermediary, or along a path that does not use IRE1 or the intermediary.

In some cases, as discussed above, the applications or computations to be run at IRE1 may require one or more security artifact(s) such as additional cryptographic keys. In such scenarios, after the configuration verification results are accepted by the query submitter (which may for example involve comparing the IRE1 attestation results to a set of acceptable results previously generated or obtained by the submitter), in various embodiments a secure (e.g., encrypted) communication channel or session may be established between the client and IRE1 via the intermediary (element 1213). In one embodiment, the submitter of the query may send a message to IRE1, CI1, and/or to the security manager indicating that the configuration verification results are acceptable. In other embodiments, the acceptance may be indicated implicitly: for example, the attempt to establish the secure channel may indicate that the verification/attestation results have been accepted, and a separate message indicating acceptance explicitly may not be needed. Any of a number of different techniques may be used to establish the secure session/channel in various embodiments. For example, the equivalent of a TLS handshake mechanism, involving the transmission of a "TLS client hello" message or the equivalent, a "TLS server hello" message or the equivalent, etc., may be used to set up the secure channel in some embodiments. Using the secure channel, one or more security artifacts of a client application (e.g., cryptographic keys to be used for the application's computations at IRE1, distinct from the keys that may have been used earlier in the process of verifying IRE1 and setting up the channel to communicate with IRE1) may be transferred to IRE1 in the depicted embodiment. The artifacts may remain inaccessible to processes/programs of the virtualization host that are not part of IRE1 in at least some embodiment—e.g., a key known within IRE1, not provided to the communication intermediary or any other process outside IRE1, may be needed to decrypt the artifact(s). Note that in some embodiments, a client on whose behalf IRE1 is established may designate a third-party artifact source (such as a key management service of a provider network), and the secure communication channel may be set up between the artifact source and IRE1 instead of between a client's computing device and IRE1. In some cases, the operations to be performed at IRE1 may not need a security artifact that has to be transferred using a secure communication channel.

One or more requests to perform computations of the client's application (using the security artifacts if needed) may be received at IRE1 (element 1216), e.g., via the intermediary agent, and the requested computations may be performed at IRE1 (element 1219). The results of the computations may be transmitted via the intermediary to one or more destinations in various embodiments. Note that the requests for the computations may be generated, for example, by processes running within CI1 in some cases, and similarly, the results may be provided to processes running within CI1.

In some embodiments, after a set of secure application computations, potentially involving the use of the security artifact(s), is completed, and/or after a timeout representing a maximum permitted lifetime duration of IRE1 expires, IRE1 may be de-configured or terminated (element 1222). In at least some embodiments, other programs/processes may continue running within CI1 after IRE1 is de-configured or terminated. In one embodiment, resources that were previously taken away from CI1 and designated for exclusive use by IRE1 may be returned to CI1 after IRE1 is terminated.

It is noted that in various embodiments, some of the operations shown in FIG. 11 and/or FIG. 12 may be implemented in a different order than that shown in the figures, or may be performed in parallel rather than sequentially. Additionally, some of the operations shown in FIG. 11 and/or FIG. 12 may not be required in one or more implementations.

Use Cases

The techniques described above, of setting up isolated run-time environments within compute instances at pre-attested hosts of a virtualized computing service, may be useful in a variety of scenarios. As more and more applications are migrated to provider network environments, and the number of applications from different sources running at a given host increases, clients of the provider network may wish to ensure that the probability of leaking or compromise of security artifacts (such as cryptographic keys used for application computations) is minimized, and that the hosts being used for their applications are themselves trustworthy. By using the described approaches, in which clients can specify third-party or client-run resource verifiers whose approval of a host is a prerequisite for running an isolated run-time environment, provider network clients may be granted an even higher level of assurance regarding the security of their artifacts and applications that is made possible simply by the use of the isolated run-time environments.

The security of applications that do not require such artifacts may also be enhanced by running them at verified/attested platforms. For example, a user may have a particular program that is certified to analyze a particular set of data. The user may run that program inside of an isolated run-time environment at a pre-approved host as described herein and may provide the particular set of data to the program inside of the isolated run-time environment, in order to ensure that only the certified program (and not others) have access to the data.

Illustrative Computer System

Figure 13:
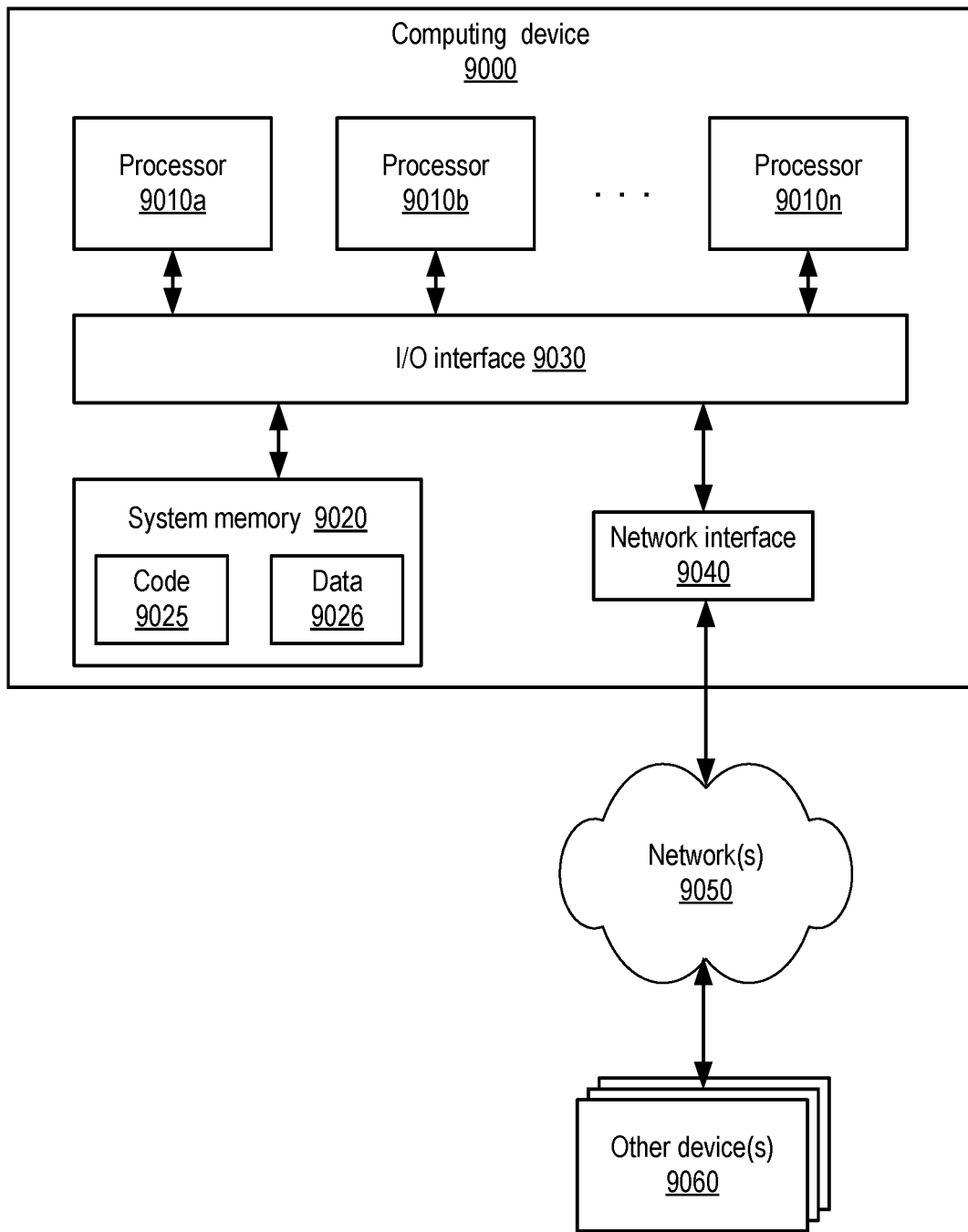
FIG. 13 is a block diagram illustrating an example computing device that may be used in at least some embodiments.

In at least some embodiments, a server that implements one or more of the techniques described herein, including for example hypervisors at virtualization hosts, compute instances with communication intermediary processes/daemons, isolated run-time environments instantiated within compute instances, control plane and/or data plane components of network-accessible services, automated resource verifiers/attesters and the like may include a general-purpose computer system that includes or is configured to access one or more computer-accessible media. FIG. 13 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 12, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 12 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 13 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:
1. A system, comprising:
one or more computing devices of a virtualized computing service;
wherein the one or more computing devices include instructions that upon execution on or across one or more processors cause the one or more computing devices to:
obtain an indication, via one or more programmatic interfaces, of (a) an automated resource verifier selected by a client of the virtualized computing service and (b) an encrypted version of a machine image to be used to launch a compute instance containing an isolated run-time environment;
identify a candidate virtualization host for launching the compute instance, wherein the candidate virtualization host comprises a hardware security device configured to generate a plurality of log records during one or more initialization operations of the candidate virtualization host;
cause one or more log records of the plurality of log records to be transmitted to the automated resource verifier, wherein the one or more log records include a first log record which indicates that a preliminary phase of establishing the isolated run-time environment has been completed by a hypervisor of the candidate virtualization host;
obtain a host approval message from the automated resource verifier, wherein the host approval message includes a first key;
decrypt the encrypted version of the machine image using the first key;
cause the hypervisor to launch the compute instance using the decrypted version of the machine image and a set of resources of the candidate virtualization host, wherein the set of resources includes a first portion of a memory of the candidate virtualization host;
cause the hypervisor to perform an additional phase of establishment of the isolated run-time environment, wherein:
a subset of the first portion of memory is allocated for exclusive use by the isolated run-time environment in the additional phase, wherein the subset is inaccessible from programs running outside the isolated run-time environment; and
network communications with endpoints outside the candidate virtualization host are prohibited from the isolated run-time environment; and
perform, at the isolated run-time environment, one or more computations using a security artifact.

2. The system as recited in claim 1, wherein the virtualized computing service comprises a set of resources at one or more data centers of a provider network, and wherein the automated resource verifier comprises a program running at a premise external to the provider network.

3. The system as recited in claim 1, wherein the one or more computing devices include further instructions that upon execution on or across the one or more processors further cause the one or more computing devices to:
transmit, prior to implementation of the preliminary phase at the first virtualization host, an example log record usable to determine, at the automated resource verifier, whether a virtualization host should be approved.

4. The system as recited in claim 1, wherein at least a portion of the first log record is formatted according to a schema which is based at least in part on a variant of a Trusted Computing Group (TCG) specification.

5. The system as recited in claim 1, wherein the one or more computing devices include further instructions that upon execution on or across the one or more processors further cause the one or more computing devices to:
in response to determining, after the isolated run-time environment has been established, that a triggering condition for initiating an additional host verification operation associated with the isolated run-time environment has been met, cause another host approval message to be obtained from the automated resource verifier.

6. A method, comprising:
performing, at one or more computing devices:
obtaining an indication, at a virtualized computing service via one or more programmatic interfaces, of (a) a first resource verifier selected by a client of the virtualized computing service and (b) an encrypted version of a machine image to be used to launch a compute instance containing an isolated run-time environment;
identifying a first virtualization host for launching the compute instance containing the isolated run-time environment of the client of the virtualized computing service, wherein the first virtualization host comprises a hardware security device configured to generate a plurality of log records during one or more initialization operations of the first virtualization host;
causing one or more log records of the plurality of log records generated by the hardware security device of the first virtualization host to be transmitted to the first resource verifier, wherein the one or more log records include a first record which indicates that a first phase of a multi-phase establishment process for establishing the isolated run-time environment has been completed by a hypervisor of the first virtualization host;
obtaining a host approval indicator from the first resource verifier based on the one or more log records, wherein the host approval indicator includes a first key; and
in response to obtaining the host approval indicator from the first resource verifier, causing, by the hypervisor, a second phase of the multi-phase establishment process for establishing the isolated run-time environment to be completed at the first virtualization host, wherein the second phase comprises:
launching the compute instance using a decrypted version of the machine image that has been decrypted using the first key;
allocating a subset of a first portion of memory, included in a set of resources of the first virtualization host, for exclusive use by the isolated run-time environment;
causing the allocated subset of the first portion of memory to be inaccessible from programs running in the compute instance but outside the isolated run-time environment; and
prohibiting network communications with endpoints outside the first virtualization host from being received in the isolated run-time environment.

7. The method as recited in claim 6, further comprising performing, at the one or more computing devices:
obtaining, at the virtualized computing service via the one or more programmatic interfaces, a network address of the first resource verifier, wherein said one or more log records are transmitted to the network address.

8. The method as recited in claim 6, wherein the virtualized computing service comprises a set of resources at one or more data centers of a provider network, and wherein the resource verifier comprises a program running at a premise external to the provider network.

9. The method as recited in claim 6, further comprising performing, at the one or more computing devices:
obtaining, at the virtualized computing service via the one or more programmatic interfaces, an indication of (a) a plurality of alternative resource verifiers including the first resource verifier and a second resource verifier, and (b) a sequence in which individual ones of the alternative resource verifiers are to be contacted by the virtualized computing service in an event that a response from one or more of the alternative resource verifiers to a transmission of a record is not received within a time interval.

10. The method as recited in claim 6, further comprising performing, at the one or more computing devices:
transmitting, from the virtualized computing service to at least the first resource verifier, prior to implementation of the first phase at the first virtualization host, an example record which indicates that the first phase has been completed.

11. The method as recited in claim 6, further comprising performing, at the one or more computing devices:
verifying, at the virtualized computing service prior to causing the multi-phase establishment of the isolated run-time environment to be completed, that the host approval indicator is from a pre-registered resource verifier which is included in a set of trusted resource verifiers.

12. The method as recited in claim 6, further comprising performing, at the one or more computing devices:
obtaining, at the virtualized computing service from the first resource verifier prior to migrating the isolated run-time environment to a second virtualization host, an approval indicator for the second virtualization host.

13. The method as recited in claim 6, further comprising performing, at the one or more computing devices:
transmitting, in response to a programmatic request, a representation of a reference implementation of the first resource verifier.

14. The method as recited in claim 6, further comprising:
decrypting the encrypted version of the machine image at the first virtualization host using the first key.

15. The method as recited in claim 6, wherein the hardware security device comprises a trusted platform module (TPM).

16. One or more non-transitory computer-accessible storage media storing program instructions that when executed on or across one or more processors cause one or more computer systems to:
obtain an indication, at a virtualized computing service via one or more programmatic interfaces, of (a) a resource verifier selected by a client of the virtualized computing service and (b) an encrypted version of a machine image to be used to launch a compute instance containing an isolated run-time environment;
identify a virtualization host for launching the compute instance containing the isolated run-time environment of the client of the virtualized computing service, wherein the virtualization host comprises a hardware security device configured to generate a plurality of log records during one or more initialization operations of the virtualization host;
cause one or more log records of the plurality of log records generated by the hardware security device of the virtualization host to be transmitted to the resource verifier, wherein the one or more log records include a first record which indicates that a first phase of a multi-phase establishment process for establishing the isolated run-time environment has been completed by a hypervisor of the virtualization host;

obtain a host approval indicator from the resource verifier based on the one or more log records, wherein the host approval indicator includes a first key; and in response to obtaining the host approval indicator from the resource verifier, causing, by the hypervisor, a second phase of the multi-phase establishment process for establishing the isolated run-time environment to be completed at the virtualization host, wherein the second phase comprises:
- launching the compute instance using a decrypted version of the machine image that has been decrypted using the first key;
- allocating a subset of a first portion of memory, included in a set of resources of the virtualization host, for exclusive use by the isolated run-time environment;
- causing the allocated subset of the first portion of memory to be inaccessible from programs running in the compute instance but outside the isolated run-time environment; and
- prohibiting network communications with endpoints outside the virtualization host from being received in the isolated run-time environment.

17. The one or more non-transitory computer-accessible storage media as recited in claim 16, wherein configuration settings of the isolated run-time environment do not permit input/output (I/O) operations to or from persistent storage.

18. The one or more non-transitory computer-accessible storage media as recited in claim 16, wherein configuration settings of the isolated run-time environment do not permit network communications between the isolated run-time environment and endpoints external to the isolated run-time environment.

19. The one or more non-transitory computer-accessible storage media as recited in claim 16, storing further program instructions that when executed on or across the one or more processors further cause one or more computer systems to:
- in response to determining, after the isolated run-time environment has been established, that a triggering condition for initiating an additional host verification operation associated with the isolated run-time environment has been met, cause another host approval indicator to be obtained from the resource verifier.

20. The one or more non-transitory computer-accessible storage media as recited in claim 16, wherein the virtualized computing service comprises a set of resources at one or more data centers of a provider network, and wherein the resource verifier comprises a program running at a premise external to the provider network.

* * * * *